US011875030B1

(12) United States Patent
King et al.

(10) Patent No.: US 11,875,030 B1
(45) Date of Patent: Jan. 16, 2024

(54) SYSTEMS AND METHODS FOR UPDATING USER INTERFACES OF MARINE ELECTRONIC DEVICES WITH ACTIVITY-BASED OPTIMIZED SETTINGS

(71) Applicant: Navico, Inc., Tulsa, OK (US)

(72) Inventors: Adam M. King, Warkworth (NZ);
Mathew J. Hooper, Auckland (NZ);
Samuel B. Carlisle, Caledonia, MI (US); Sergiu Tulgara, Gothenburg (SE)

(73) Assignee: Navico, Inc., Tulsa, OK (US)

( * ) Notice: Subject to any disclaimer, the term of this patent is extended or adjusted under 35 U.S.C. 154(b) by 0 days.

(21) Appl. No.: 18/167,229

(22) Filed: Feb. 10, 2023

Related U.S. Application Data

(60) Provisional application No. 63/479,031, filed on Jan. 9, 2023.

(51) Int. Cl.
*G06F 3/04847* (2022.01)
*G06F 3/0482* (2013.01)

(52) U.S. Cl.
CPC ........ *G06F 3/04847* (2013.01); *G06F 3/0482* (2013.01)

(58) Field of Classification Search
CPC .......................... G06F 3/0482; G06F 3/04847
See application file for complete search history.

(56) References Cited

U.S. PATENT DOCUMENTS

| | | | |
|---|---|---|---|
| 7,444,213 B2 | 10/2008 | Motose | |
| 7,683,771 B1 | 3/2010 | Loeb | |
| 9,500,485 B2 | 11/2016 | Miichi et al. | |
| 9,718,530 B2 | 8/2017 | Kabel et al. | |
| 9,764,807 B2 | 9/2017 | Frisbie et al. | |
| 9,950,778 B2 | 4/2018 | Kabel et al. | |
| 2019/0000049 A1* | 1/2019 | Bonutti | A01K 73/10 |
| 2019/0120959 A1* | 4/2019 | Laster | G01S 15/86 |
| 2021/0227817 A1* | 7/2021 | Gierke | G01S 15/96 |
| 2021/0325679 A1* | 10/2021 | Layne | G02B 27/0172 |
| 2022/0104015 A1* | 3/2022 | McDevitt | H04N 21/6547 |
| 2022/0374186 A1 | 11/2022 | Gatland et al. | |
| 2023/0072466 A1* | 3/2023 | Zorea | G01S 7/0235 |

* cited by examiner

*Primary Examiner* — Seth A Silverman
(74) *Attorney, Agent, or Firm* — Nelson Mullins Riley & Scarborough LLP

(57) ABSTRACT

A system is provided for updating user interfaces of marine electronic devices. The system includes determining available devices and receiving user input to determine information such as fishing location, fishing style, fish type, and fishing depth. The system also includes determining a plurality of screen setups to present to a user based on the received user input and the determined available devices. The system then enables selection from among the plurality of screen setups by the user and causes the marine electronic device to operate according to the selected screen setup. The system may optimize settings based on the user input. Further, a system is provided for connecting an unconnected device to a marine electronic device. A system is also provided for communicating information about an unconnected device on a watercraft to a user.

20 Claims, 20 Drawing Sheets

SYSTEMS AND METHODS FOR UPDATING USER INTERFACES OF MARINE ELECTRONIC DEVICES WITH ACTIVITY-BASED OPTIMIZED SETTINGS

CROSS-REFERENCE TO RELATED APPLICATION(S)

This application claims priority to U.S. Provisional Application No. 63/479,031, filed Jan. 9, 2023, entitled "Systems and Methods for Updating User Interfaces of Marine Electronic Devices with Activity-Based Optimized Settings", the contents of which is incorporated by reference herein in its entirety.

FIELD OF THE INVENTION

Embodiments of the present invention relate generally to marine electronic devices, and more particularly, to automatically updating user interfaces of marine electronic devices with optimized settings based on planned user activity associate with the marine electronic device.

BACKGROUND OF THE INVENTION

Marine electronic devices have been used to display marine data to a user on a watercraft. For example, marine electronic devices may be mounted on a watercraft to display depth data, chart data, or sonar data on a screen of the marine electronic device to aid a user, e.g., while fishing. The presentation of data on the screen of the marine electronic device, however, is often specialized in several respects and the user might have varying needs depending on a variety of factors. In this regard, different types of marine electronic devices provide different functionality, many with differing benefits. As such, there is need for marine electronic devices with improved user interface functionality while still providing a reasonable cost to the user.

BRIEF SUMMARY OF THE INVENTION

In some cases, a user may have limited knowledge with respect to his or her needs regarding what to display and/or how to display imagery and information on the marine electronic device. That is, a user may not have background knowledge sufficient to select optimal user interface settings and image options for a desired activity. Even if the user has sufficient knowledge, it may be timely to adjust the screen setup.

Accordingly, some example embodiments of the present invention provide various systems and methods for automatically updating a marine electronic device based on a desired user activity. Some example systems include a marine electronic device, a processor, and a memory. The memory has computer executable instructions configured to cause the processor to receive user input related to, e.g., a fishing location, a fishing style, a fish type, and/or a fishing depth, and then determine one or more available devices that are connected to the marine electronic device. The example systems may then use the received user input to determine a plurality of screen setups to be presented to the user for selection. When the user selects a screen setup, the example system may be configured to cause the marine electronic device to operate according to the selected screen setup. In some embodiments, one or more settings of how the type of data is presented or used may be adjusted based on the user input. This provides a user-friendly automatic user interface setup, which is particularly helpful for a novice user, as it lessens the barrier to entry for a novice user to get out and fish effectively.

Some other example systems include a screen, a processor, and a memory, and the memory may have computer executable instructions configured to cause the processor to detect an unconnected device proximate a watercraft, present information to a user showing the unconnected device on a representation of the watercraft and receive user input indicating the user's desired position of the unconnected device. The example systems may then be configured to store a name and the desired position for the device in the memory such that the device is connected. Such an example device connection system helps effectively and efficiently name devices, which helps when the user wants to select certain devices for viewing and/or use. This is, again, particularly helpful for novice users, who can otherwise get confused or frustrated when the imagery doesn't match what they think it should (e.g., they select the wrong transducer to view sonar imagery from).

Further, some other example systems include a screen, a processor, and a memory, and the memory may have computer executable instructions configured to cause the processor to detect an unconnected device and then communicate information, such as connection method(s) and instructions, to a user such that the user is informed of how to connect the unconnected device. Such a system aids a user in connecting devices to the watercraft network, which can be particularly helpful for novice users.

In this regard, various embodiments of the present invention are suitable for users of all levels. For example, various embodiments of the present invention allow a novice user to easily generate screen setups designed to aid them in their desired activity, making the boating experience more enjoyable.

In an example embodiment, a system is provided for updating a graphical user interface for a marine electronic device of a watercraft. The system includes a screen of the marine electronic device, a processor, and a memory including computer executable instructions. The computer executable instructions are configured to, when executed by the processor, cause the processor to receive user input. The user input includes at least two of a fishing location, a fishing style, a fish type, or a fishing depth. The computer executable instructions are also configured to determine one or more available devices. Each of the one or more available devices are connected to the marine electronic device and configured to provide one or more images to the marine electronic device for presentation on the screen of the marine electronic device. The computer executable instructions are also configured to determine a plurality of screen setups to present to a user based on the received user input and the determined one or more available devices. Each of the plurality of screen setups includes presentation of at least two image types corresponding to the one or more images provided by the determined one or more available devices. The presentation of the at least two image types covers at least a portion of the screen of the marine electronic device, and each of the at least two image types provide at least one of chart data, sonar data, radar data, or vessel data. The computer executable instructions are also configured to enable selection from among the plurality of screen setups by the user and receive a user selection of a selected screen setup from among the plurality of screen setups. The selected screen setup includes a first selected image type from a first device of the determined one or more available devices and a second selected image type from a second device of the determined one or more available devices. The computer executable instructions are also configured to cause the marine electronic device to operate according to the selected screen setup such that the screen of the marine electronic device includes presentation of the first selected image type and the second selected image type.

In some embodiments, the computer executable instructions may be further configured to enable de-selection of at least one of the one or more available devices before the plurality of screen setups is determined.

In some embodiments, the computer executable instructions may be further configured to determine the plurality of screen setups to include a first available screen setup that includes the first selected image type that provides a first type of sonar data and the second selected image type that provides the chart data. The first type of sonar data may be determined from among at least two types of sonar data that are available from the determined one or more available devices, and the first type of sonar data may be determined instead of a second type of sonar data based on the received user input of a certain fish type that the user is hoping to catch.

In some embodiments, the computer executable instructions may be further configured to determine the plurality of screen setups to include a second available screen setup that includes a first selected image type that provides the first type of sonar data, a second selected image type that provides the chart data, and a third selected image type that provides the radar data.

In some embodiments, the second available screen setup may be configured such that the first selected image type is presented on half of the screen, the second selected image type is presented on a first quarter of the screen, and the third selected image type is presented on a second quarter of the screen.

In some embodiments, the computer executable instructions are further configured to determine the plurality of screen setups to include a first available screen setup that includes the first selected image type that provides a first type of sonar data and the second selected image type that provides the radar data. The first type of sonar data may be determined from among at least two types of sonar data that are available from the determined one or more available devices, and the first type of sonar data may be determined instead of a second type of sonar data based on the received user input of a certain fish type that the user is hoping to catch.

In some embodiments, the computer executable instructions may be further configured to determine the plurality of screen setups such that the first selected image type of the selected screen setup provides a first type of sonar data. The first selected image type may be further determined to have a determined setting for an adjustable setting, and the determined setting may be determined based on the user input.

In some embodiments, the adjustable setting may be a depth window setting.

In some embodiments, the determined setting may be determined automatically based on the user input.

In some embodiments, the determined setting may be selected by the user.

In some embodiments, at least one of a depth window minimum or a depth window maximum of the depth window setting may be user selectable.

In some embodiments, the computer executable instructions may be further configured to determine the plurality of screen setups such that the first selected image type of the selected screen setup provides chart data. The first selected image type may be further determined to have a determined setting for an adjustable setting, and the determined setting may be determined based on the user input.

In some embodiments, the adjustable setting may be a zoom level setting.

In some embodiments, the determined setting may be determined automatically based on the user input.

In some embodiments, the determined setting may be selected by the user.

In some embodiments, the computer executable instructions may be further configured to determine the plurality of screen setups such that the first selected image type of the selected screen setup is further determined to have a determined setting for an adjustable setting, and the determined setting may be determined based on one or more points of interest.

In some embodiments, the computer executable instructions may be further configured to detect a device proximate the watercraft, present, on the screen, a movable representation of the device with an image representing the watercraft, receive user input moving the movable representation of the device to a desired position on the image representing the watercraft, determine the desired position, determine a name for the device, and store the name and the desired position for the device in the memory.

In some embodiments, the computer executable instructions may be further configured to detect an unconnected device, determine identification information for the unconnected device, determine at least one connection method for the unconnected device, and present an indication to the user on the screen. The indication may include the at least one connection method.

In another example embodiment, a marine electronic device is provided for presenting marine data associated with a watercraft. The marine electronic device includes a screen, a processor, and a memory including computer executable instructions. The computer executable instructions are configured to, when executed by the processor, cause the processor to receive user input. The user input includes at least two of a fishing location, a fishing style, a fish type, or a fishing depth. The computer executable instructions are also configured to determine one or more available devices. Each of the one or more available devices are connected to the marine electronic device and configured to provide one or more images to the marine electronic device for presentation on the screen of the marine electronic device. The computer executable instructions are also configured to determine a plurality of screen setups to present to a user based on the received user input and the determined one or more available devices. Each of the plurality of screen setups includes presentation of at least two image types corresponding to the one or more images provided by the determined one or more available devices. The presentation of the at least two image types covers at least a portion of the screen of the marine electronic device, and each of the at least two image types provide at least one of chart data, sonar data, radar data, or vessel data. The computer executable instructions are also configured to enable selection from among the plurality of screen setups by the user and receive a user selection of a selected screen setup from among the plurality of screen setups. The selected screen setup includes a first selected image type from a first device of the determined one or more available devices and a second selected image type from a second device of the determined one or more available devices. The computer executable instructions are also configured to cause the marine electronic device to operate according to the selected screen setup such that the screen of the marine electronic device includes presentation of the first selected image type and the second selected image type.

In another example embodiment, a method is provided for updating a graphical user interface for a marine electronic device of a watercraft. The method includes receiving user input. The user input includes at least two of a fishing location, a fishing style, a fish type, or a fishing depth. The method also includes determining one or more available devices. Each of the one or more available devices are connected to the marine electronic device and configured to provide one or more images to the marine electronic device for presentation on a screen of the marine electronic device. The method also includes determining a plurality of screen setups to present to a user based on the received user input and the determined one or more available devices. Each of the plurality of screen setups includes presentation of at least two image types corresponding to the one or more images provided by the determined one or more available devices. The presentation of the at least two image types covers at least a portion of the screen of the marine electronic device, and each of the at least two image types provide at least one of chart data, sonar data, radar data, or vessel data. The method also includes enabling selection from among the plurality of screen setups by the user and receiving a user selection of a selected screen setup from among the plurality of screen setups. The selected screen setup includes a first selected image type from a first device of the determined one or more available devices and a second selected image type from a second device of the determined one or more available devices. The method also includes causing the marine electronic device to operate according to the selected screen setup such that the screen of the marine electronic device includes presentation of the first selected image type and the second selected image type.

In another example embodiment, a system is provided for connecting a device to a network for a watercraft. The system includes a screen, a processor, and a memory including computer executable instructions. The computer executable instructions are configured to, when executed by the processor, cause the processor to detect a device proximate the watercraft, present, on the screen, a movable representation of the device with an image representing the watercraft, receive user input moving the movable representation of the device to a desired position on the image representing the watercraft, determine the desired position, determine a name for the device, and store the name and the desired position for the device in the memory.

In some embodiments, the processor may be further configured to present a device icon as the movable representation of the device and present the device icon overtop the image representing the watercraft in a way that depicts a detected current position of the device.

In some embodiments, the user input may include dragging the movable representation of the device to the desired position on the image representing the watercraft.

In some embodiments, the processor may be further configured to receive one or more image types from the device and update the memory to include the one or more image types for presentation on the screen.

In some embodiments, each of the one or more image types from the device may provide at least one of chart data, sonar data, radar data, or vessel data.

In some embodiments, the processor may be further configured to receive data from the device and store imagery that is representative of the device based on the received data.

In some embodiments, the movable representation of the device may be the stored imagery.

In some embodiments, the processor may be further configured to detect a second device, present, on the screen, a second movable representation of the second device with the image representing the watercraft, receive second user input moving the second movable representation of the second device to a second desired position on the watercraft, determine the second desired position, determine a second name for the second device, and store the second name and the second desired position for the second device in the memory.

In another example embodiment, a method is provided for connecting a device to a network for a watercraft. The method includes detecting a device proximate the watercraft, presenting, on a screen of a marine electronic device, a movable representation of the device with an image representing the watercraft, receiving user input moving the movable representation of the device to a desired position on the watercraft, determining the desired position, determining a name for the device, and storing the name and the desired position for the device in memory for the marine electronic device.

In another example embodiment, a graphical user interface is provided for connecting a device to a network for a watercraft. The graphical user interface is configured to present a movable representation of a detected device with an image representing the watercraft, receive user input moving the movable representation of the device to a desired position on the watercraft, determine the desired position, determine a name for the device, and store the name and the desired position for the device in memory for a marine electronic device.

In another example embodiment, a system is provided for communicating information about an unconnected device on a watercraft to a user. The system includes a screen, a processor, and a memory including computer executable instructions. The computer executable instructions are configured to, when executed by the processor, cause the processor to detect the unconnected device, determine identification information for the unconnected device, determine at least one connection method for the unconnected device, and present an indication to the user on the screen. The indication includes the at least one connection method.

In some embodiments, the processor may be further configured to determine connection instructions based on the at least one connection method.

In some embodiments, the processor may be further configured to present the connection instructions to the user.

In some embodiments, the processor may be further configured to receive user input to determine whether to connect the unconnected device.

In some embodiments, the processor may be further configured to connect the unconnected device based on the user input.

In some embodiments, the processor may be further configured to receive one or more image types from the device and update the memory to include the one or more image types for presentation on the screen.

In some embodiments, each of the one or more image types from the device may provide at least one of chart data, sonar data, radar data, or vessel data.

In some embodiments, the processor may be further configured to detect the unconnected device using at least one of Bluetooth or Wi-Fi.

In some embodiments, the processor may be further configured to initiate an augmented reality-based software that is operable to scan an environment for components and, based on scan results, present instructions to the user.

In another example embodiment, a method is provided for communicating information about an unconnected device on a watercraft to a user. The method includes detecting the unconnected device, determining identification information for the unconnected device, determining at least one connection method for the unconnected device, and presenting an indication to the user on a screen of a marine electronic device. The indication includes the at least one connection method.

Associated methods of operating and manufacturing various example systems and assemblies described herein are also contemplated.

BRIEF DESCRIPTION OF THE DRAWINGS

Figure 1:
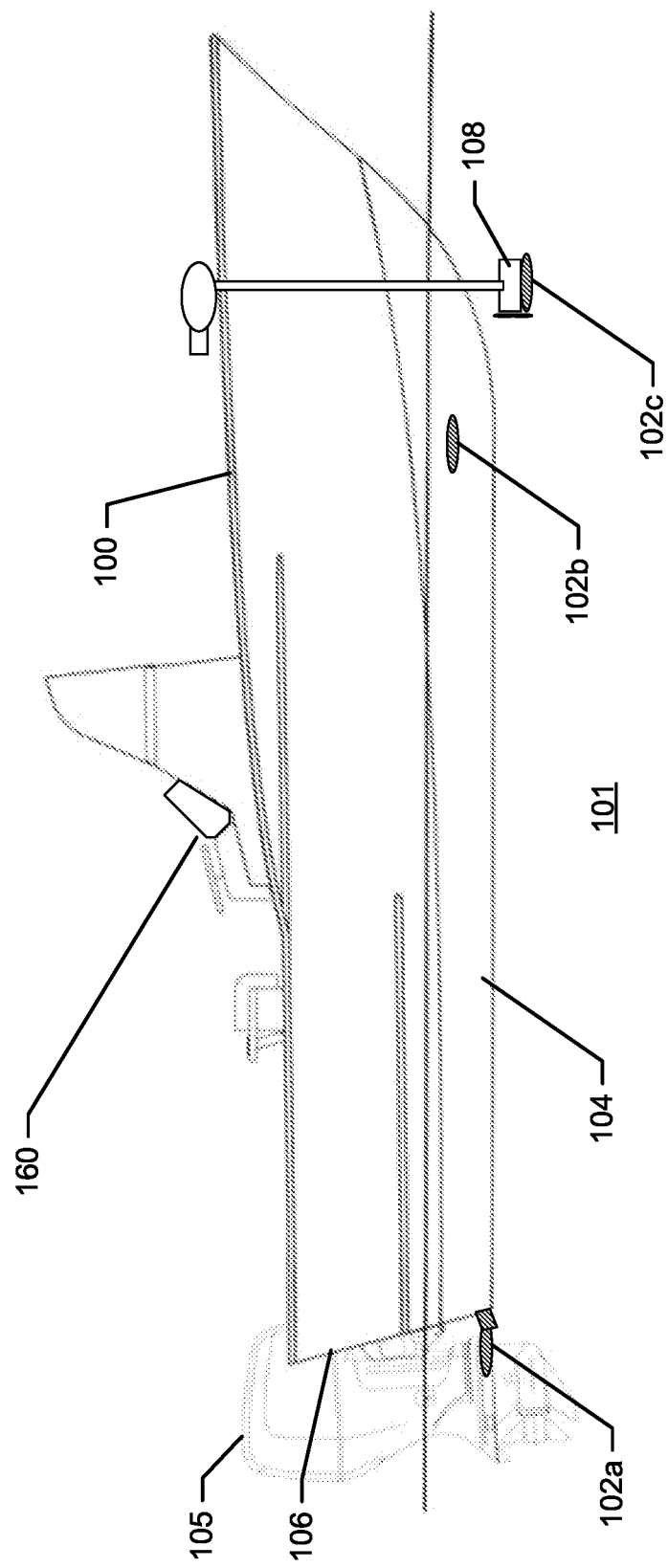
Figure 2:
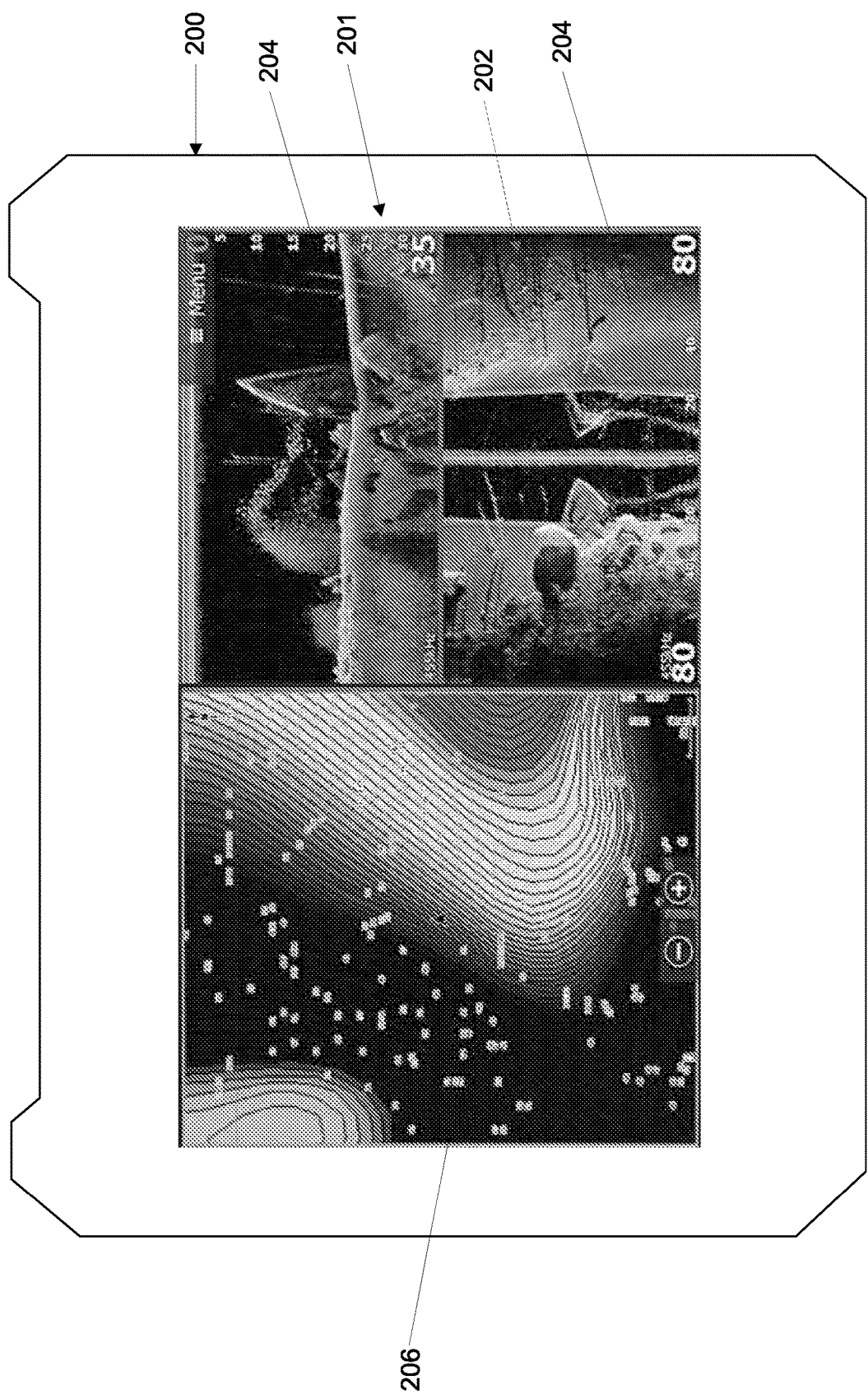
Figure 3:
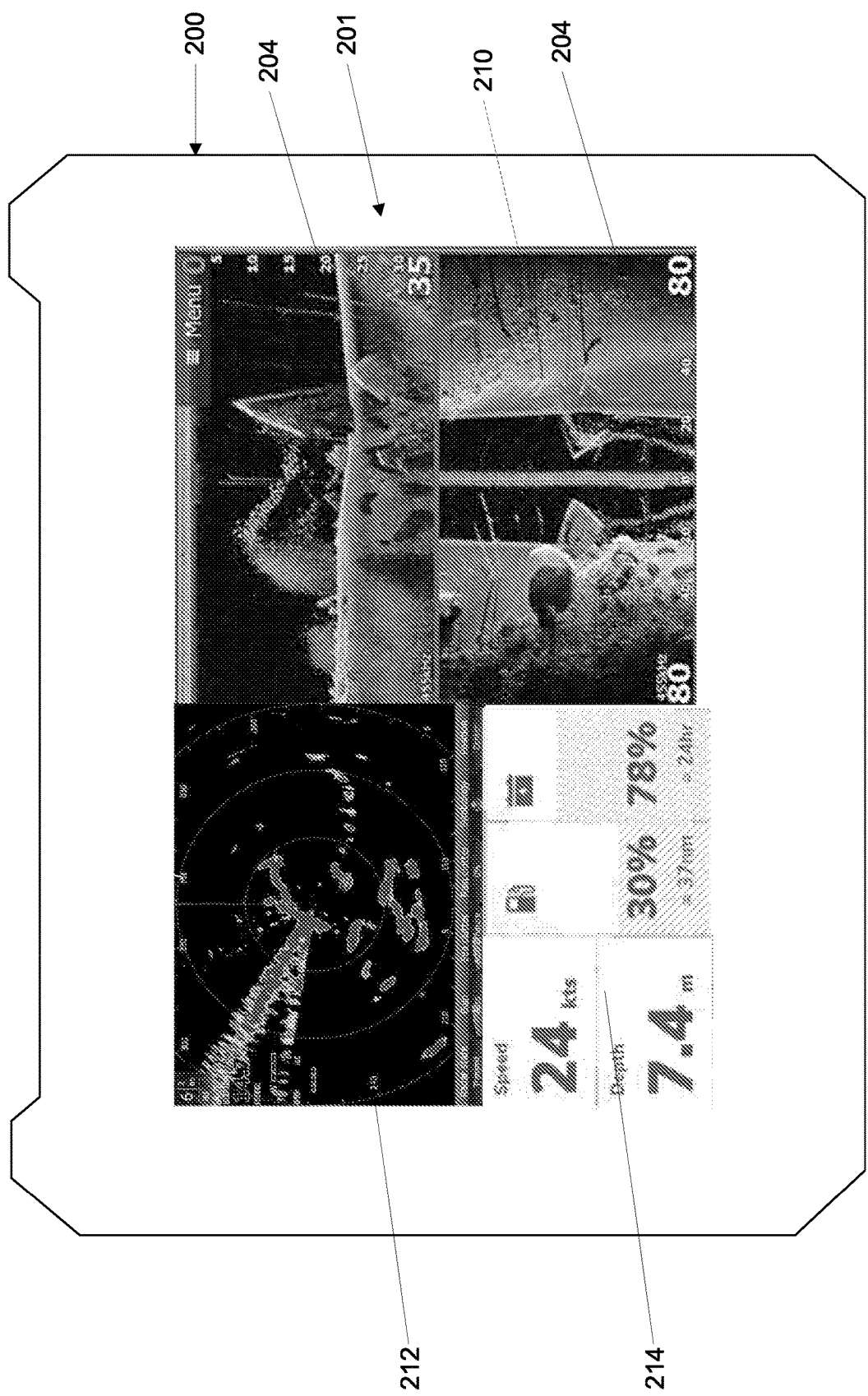
Figure 4:
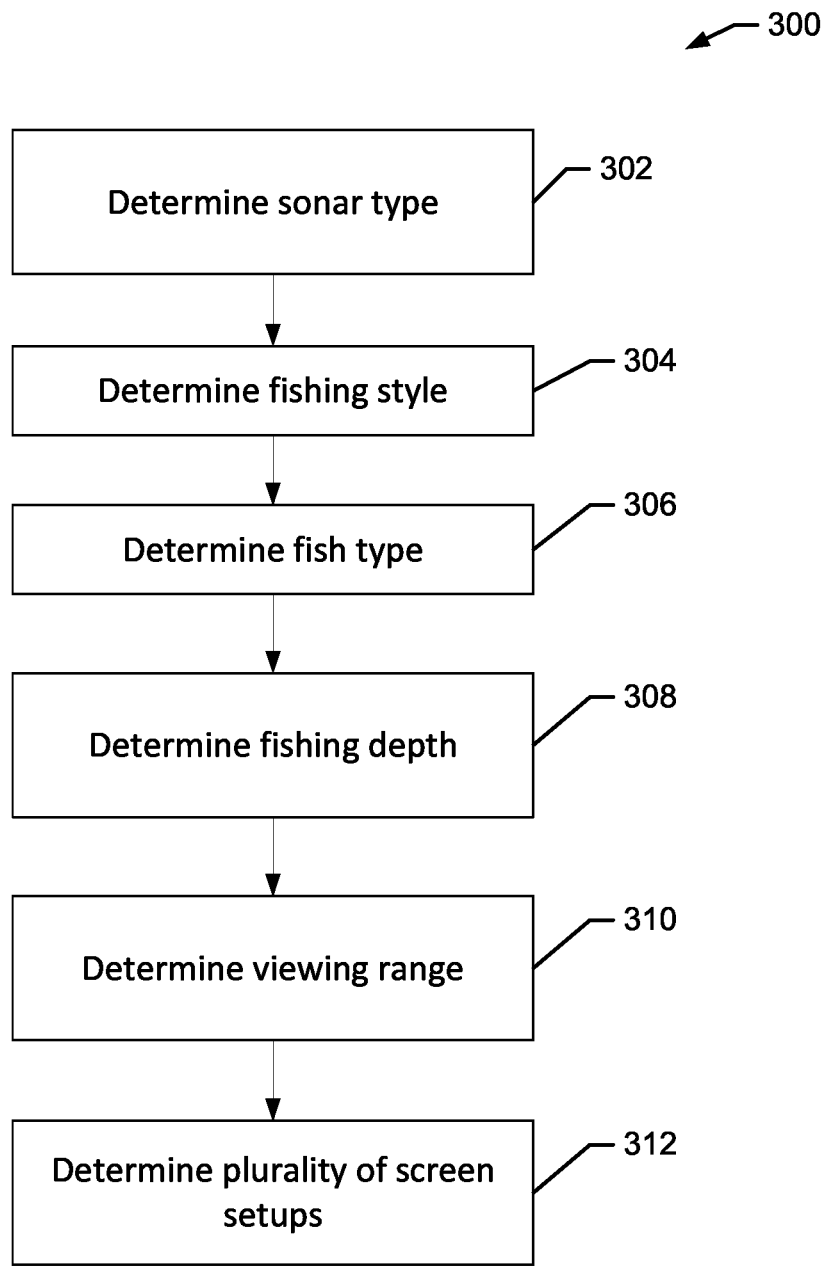
Figure 5:
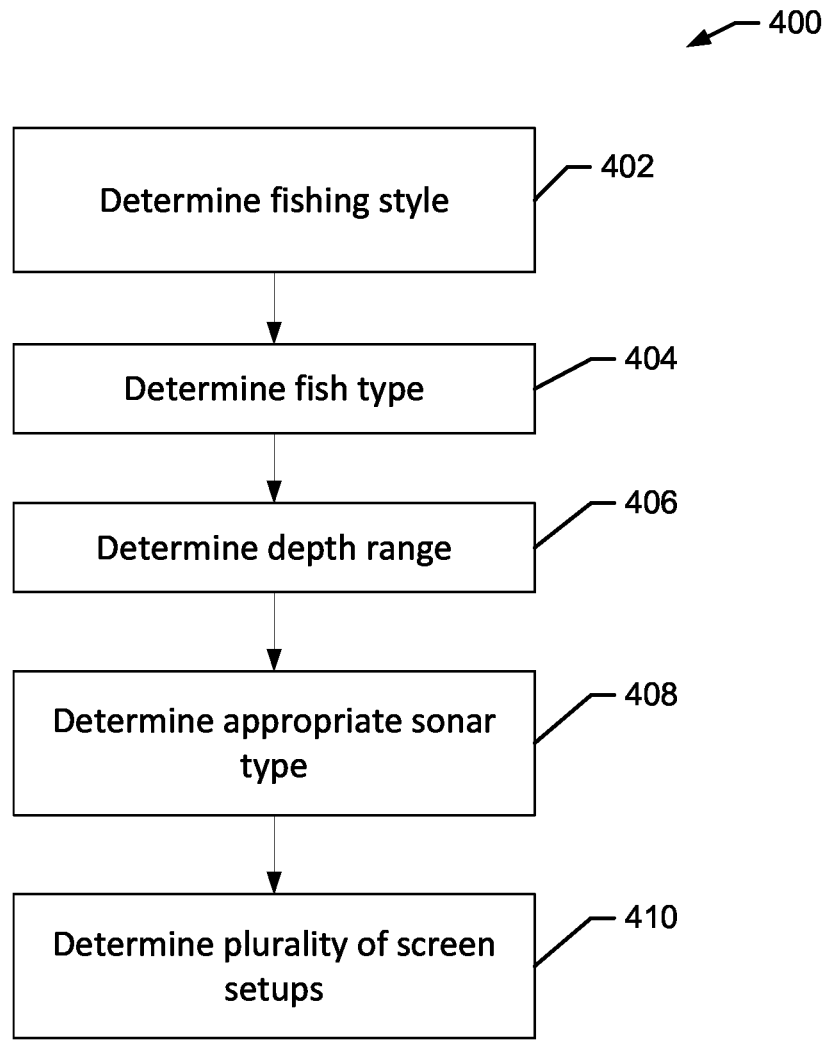
Figure 6:
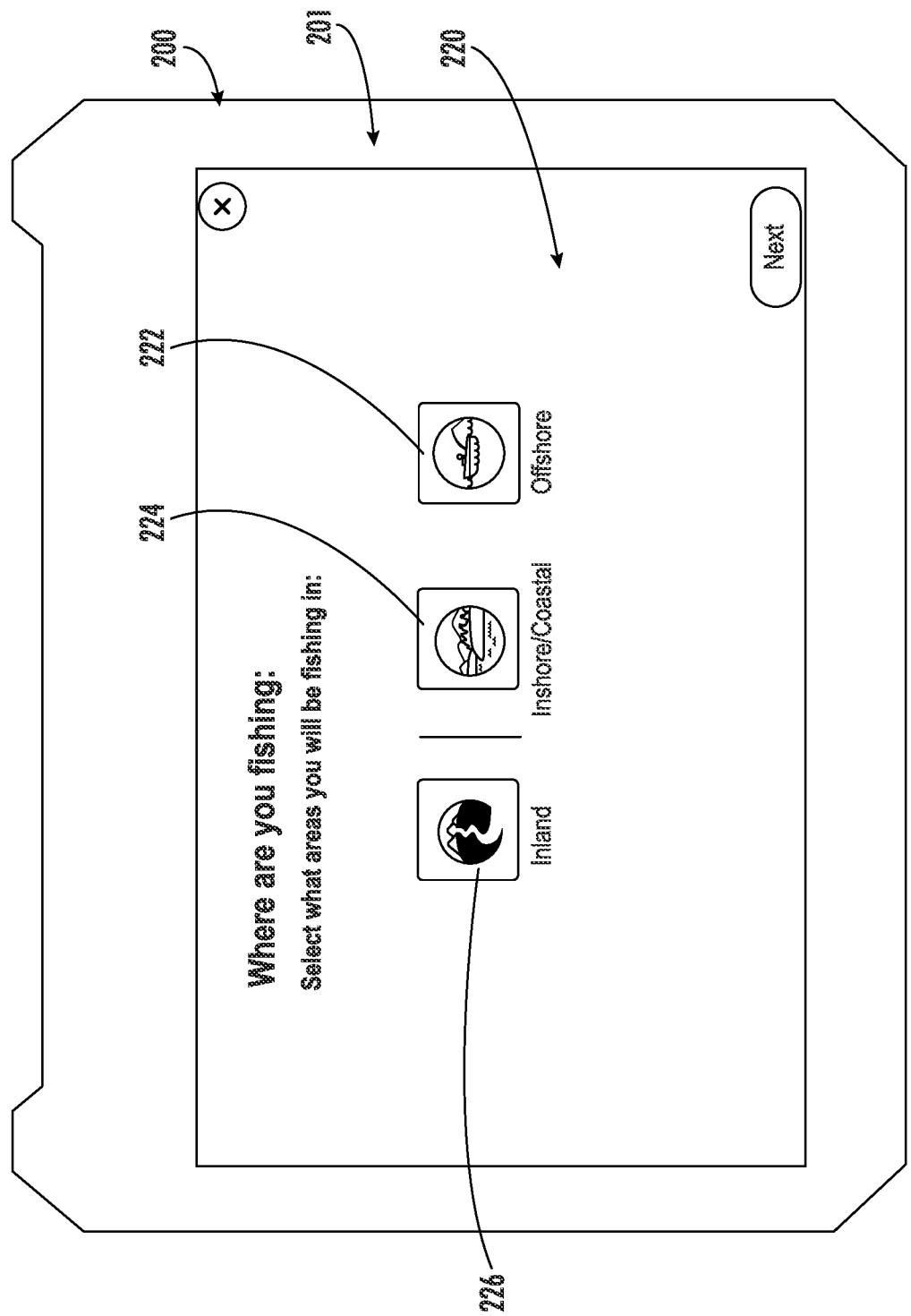
Figure 7:
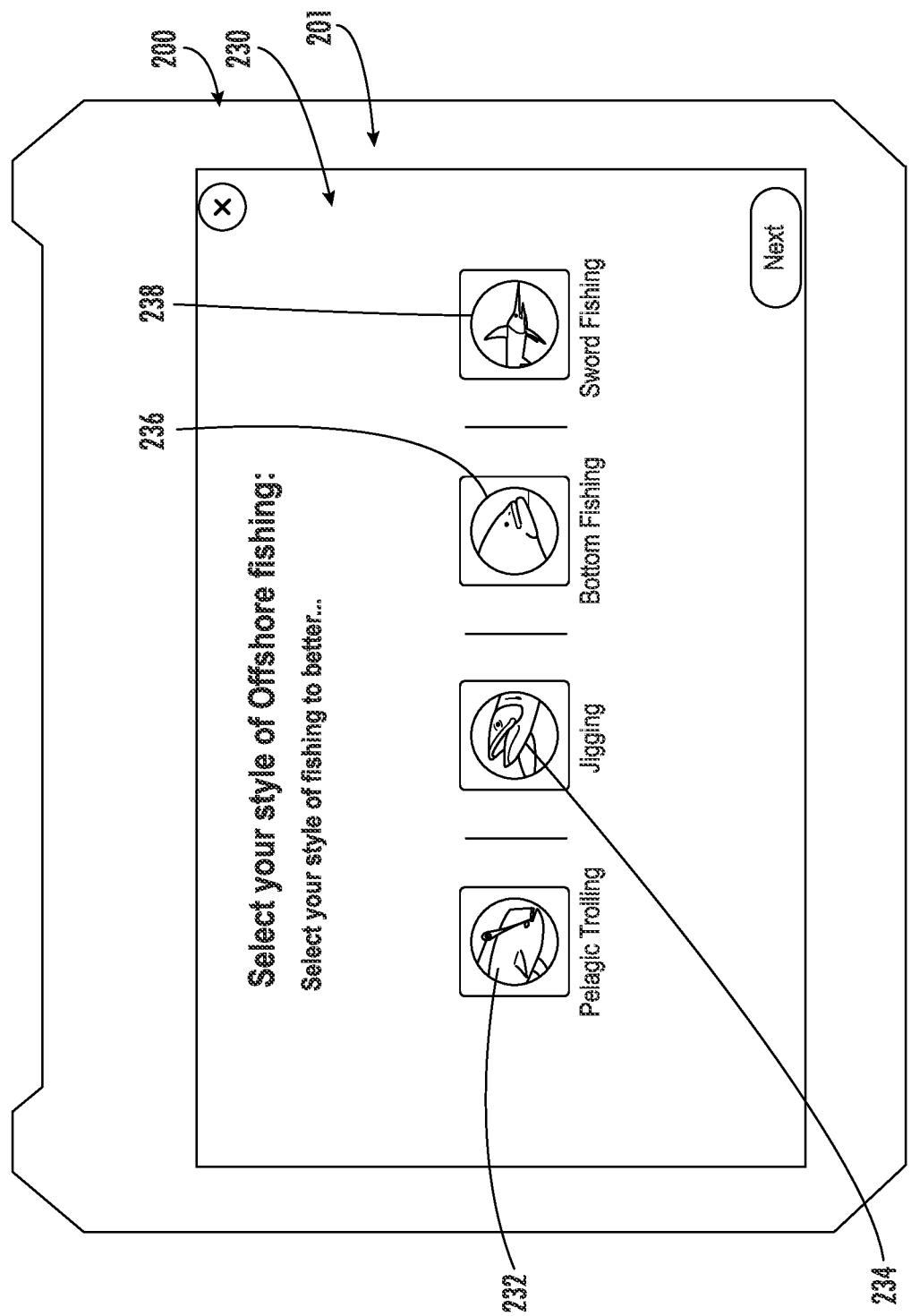
Figure 8:
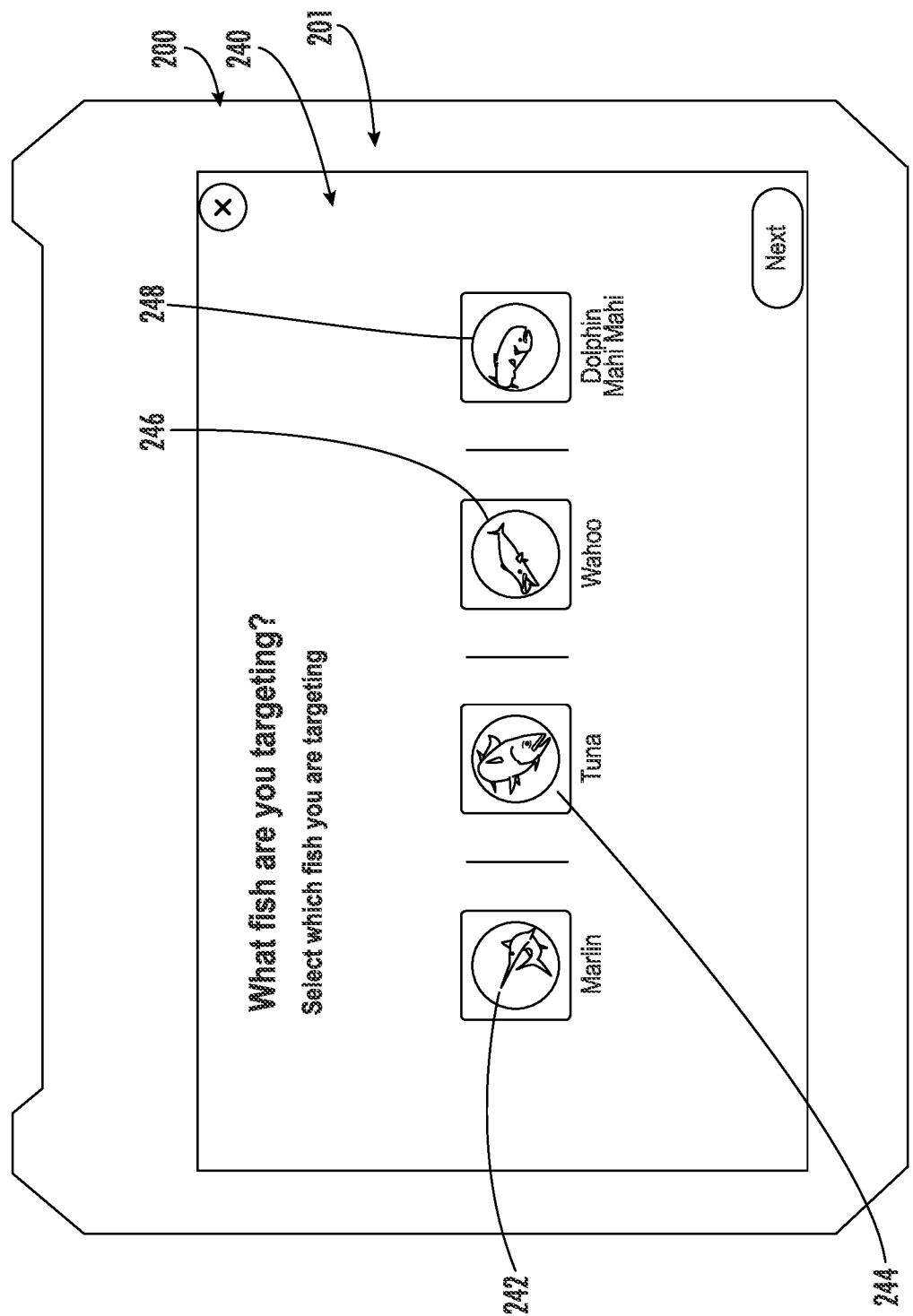
Figure 9:
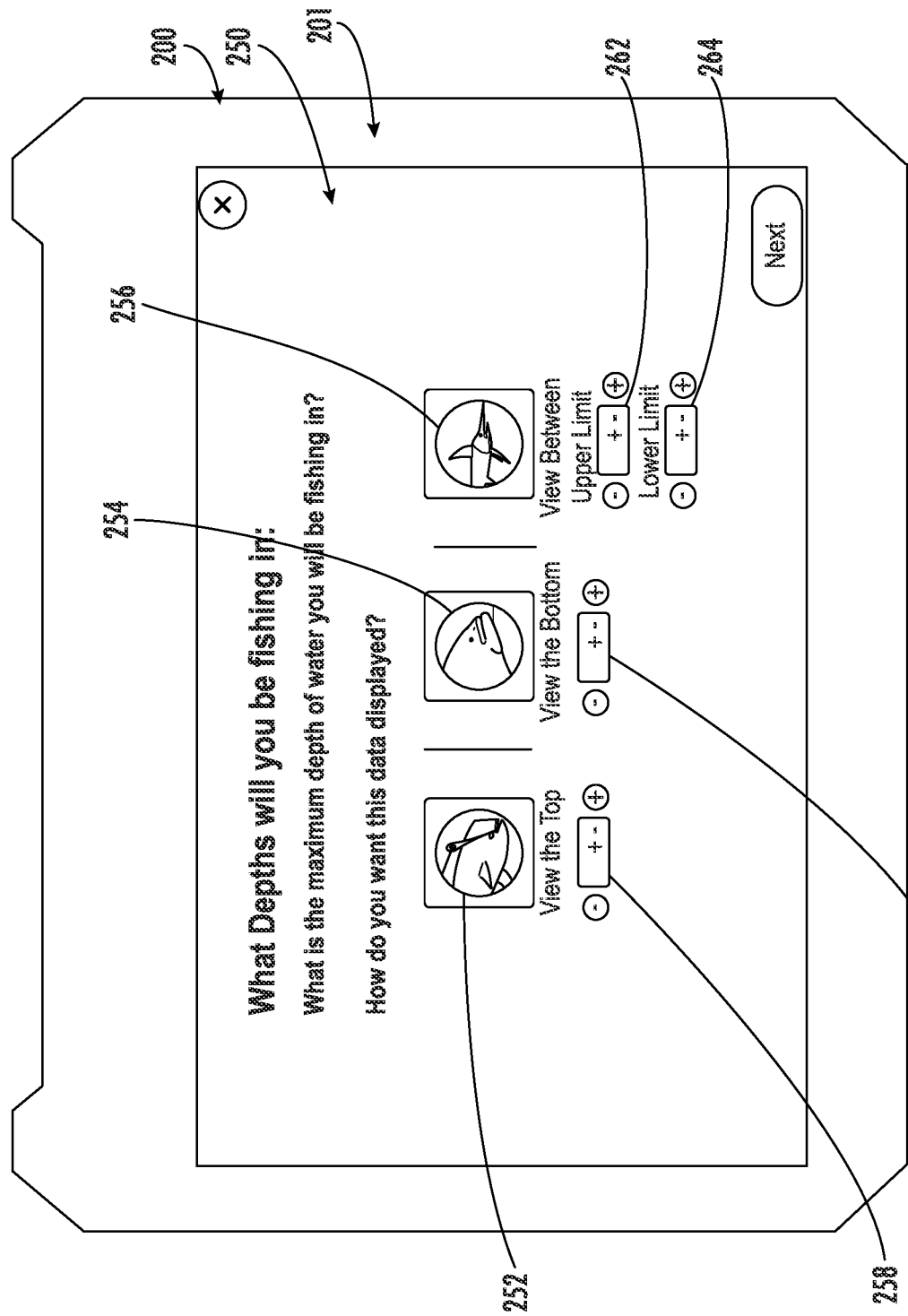
Figure 10:
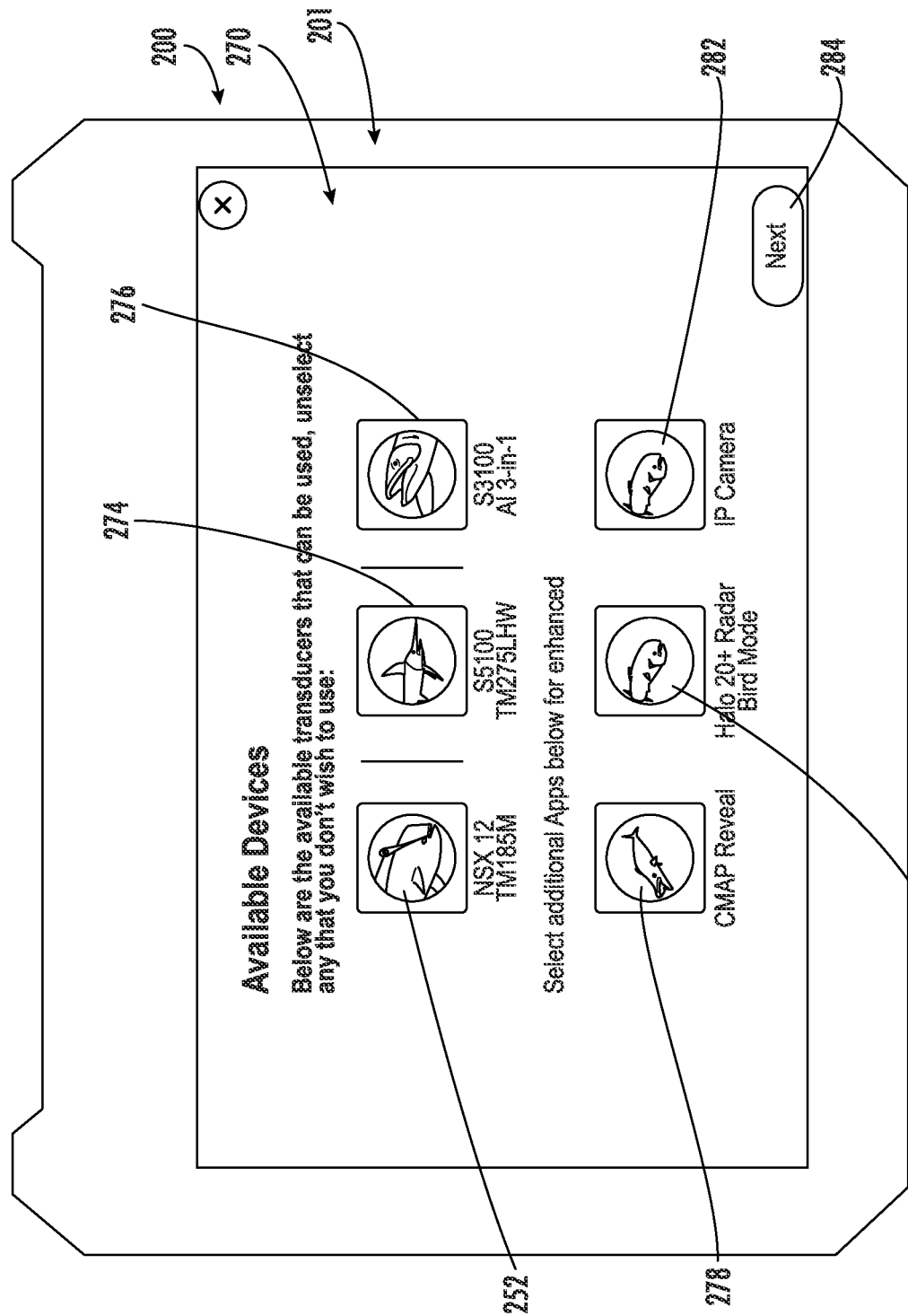
Figure 11:
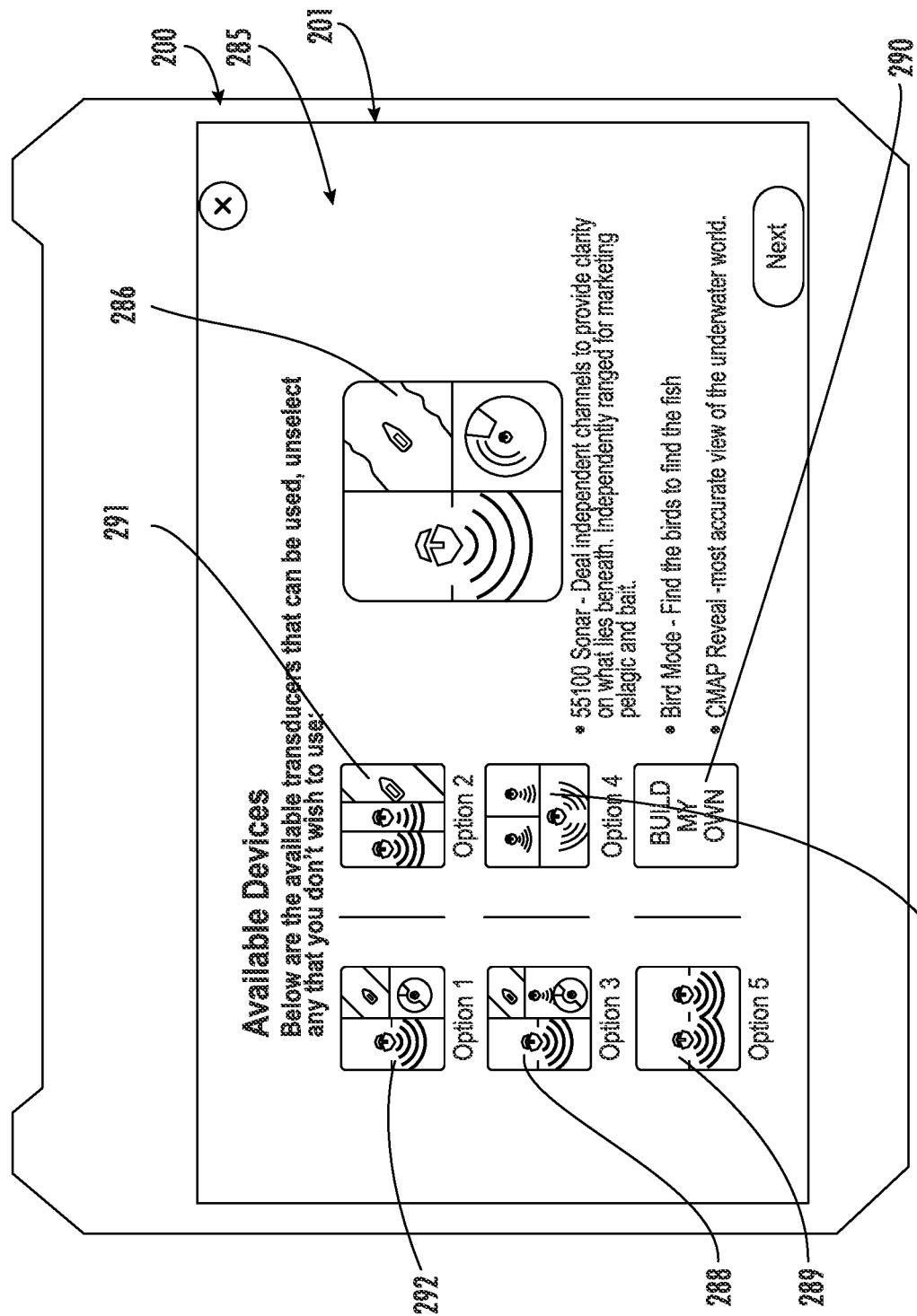
Figure 12:
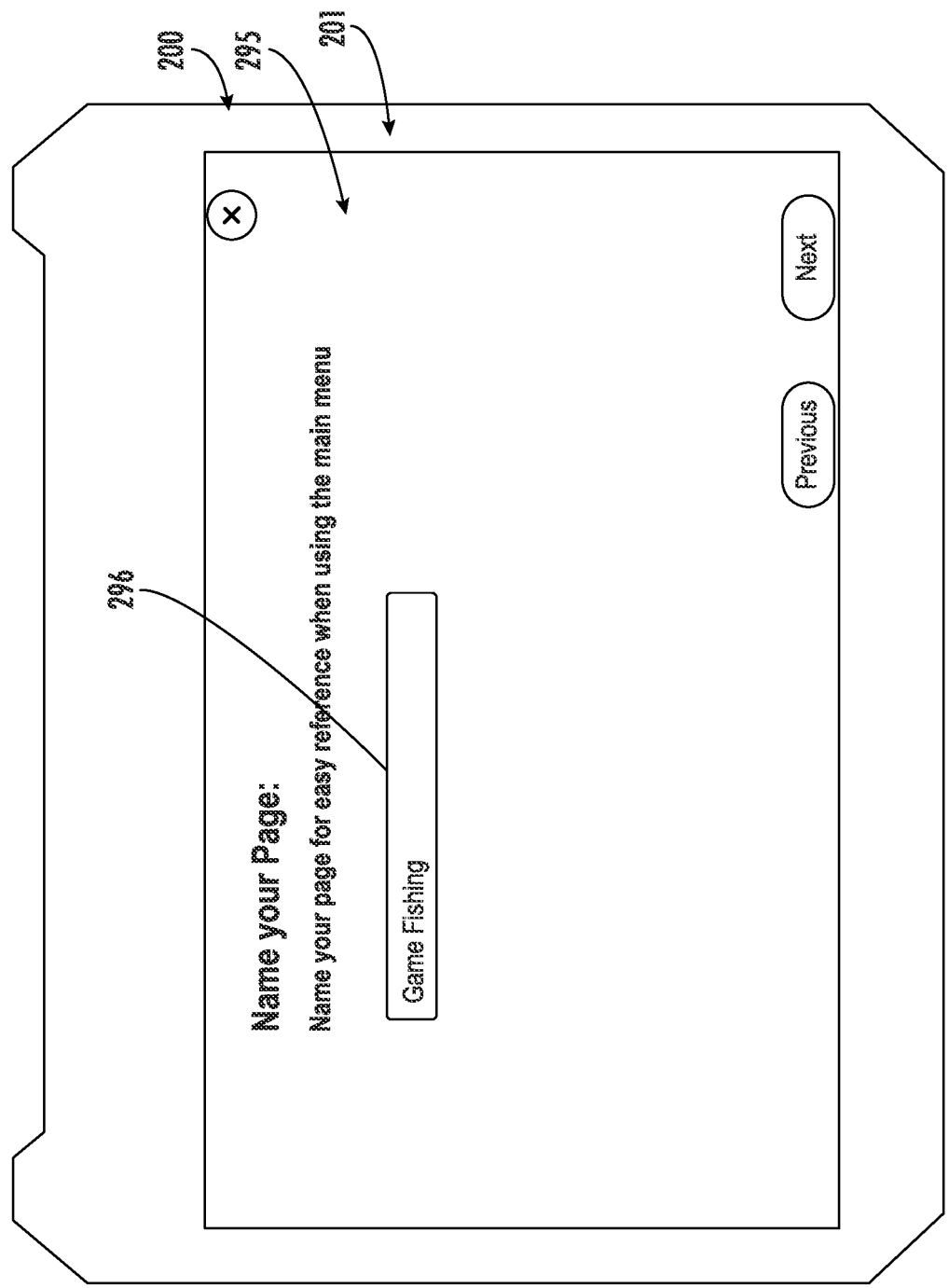
Figure 13:
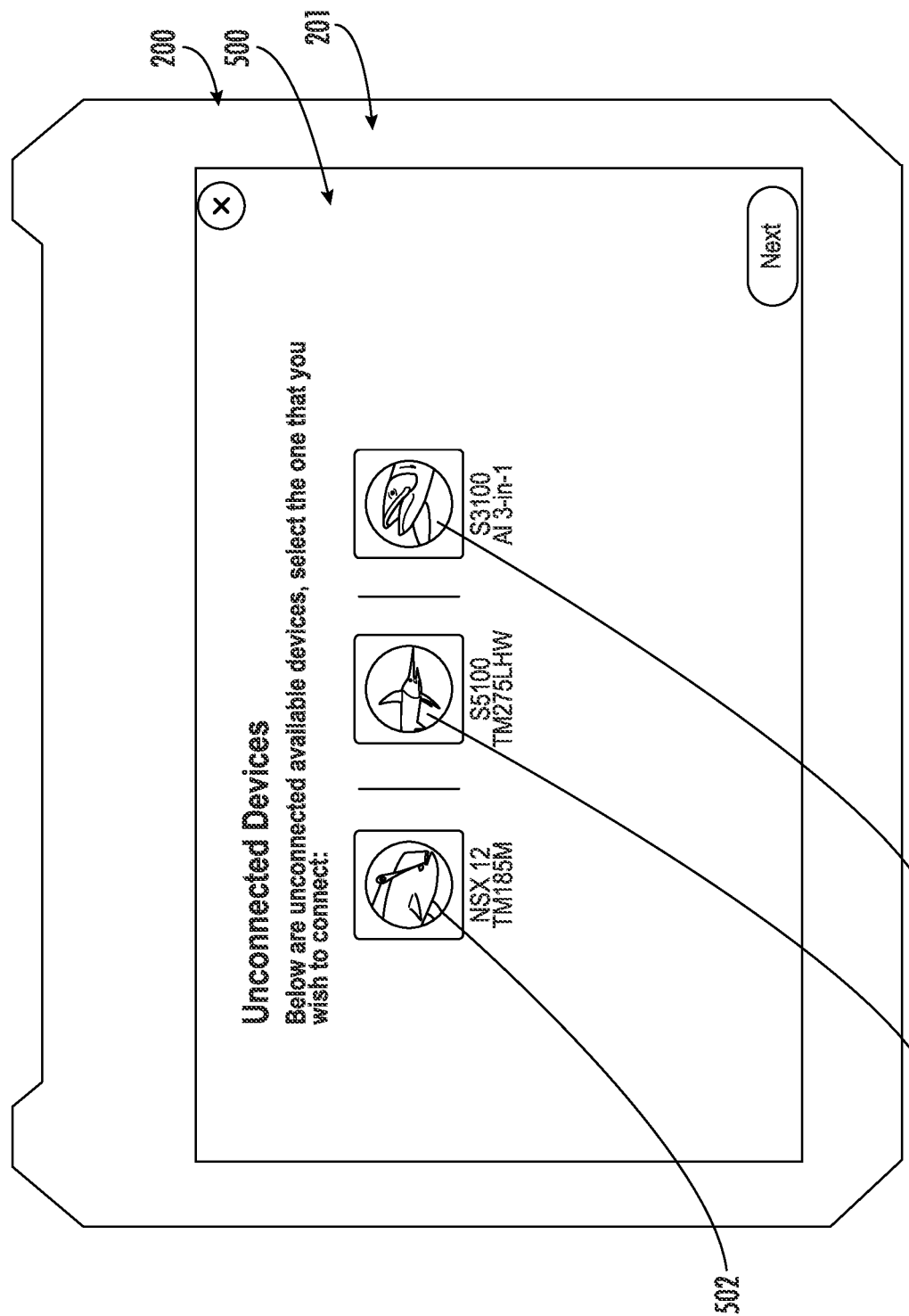
Figure 14:
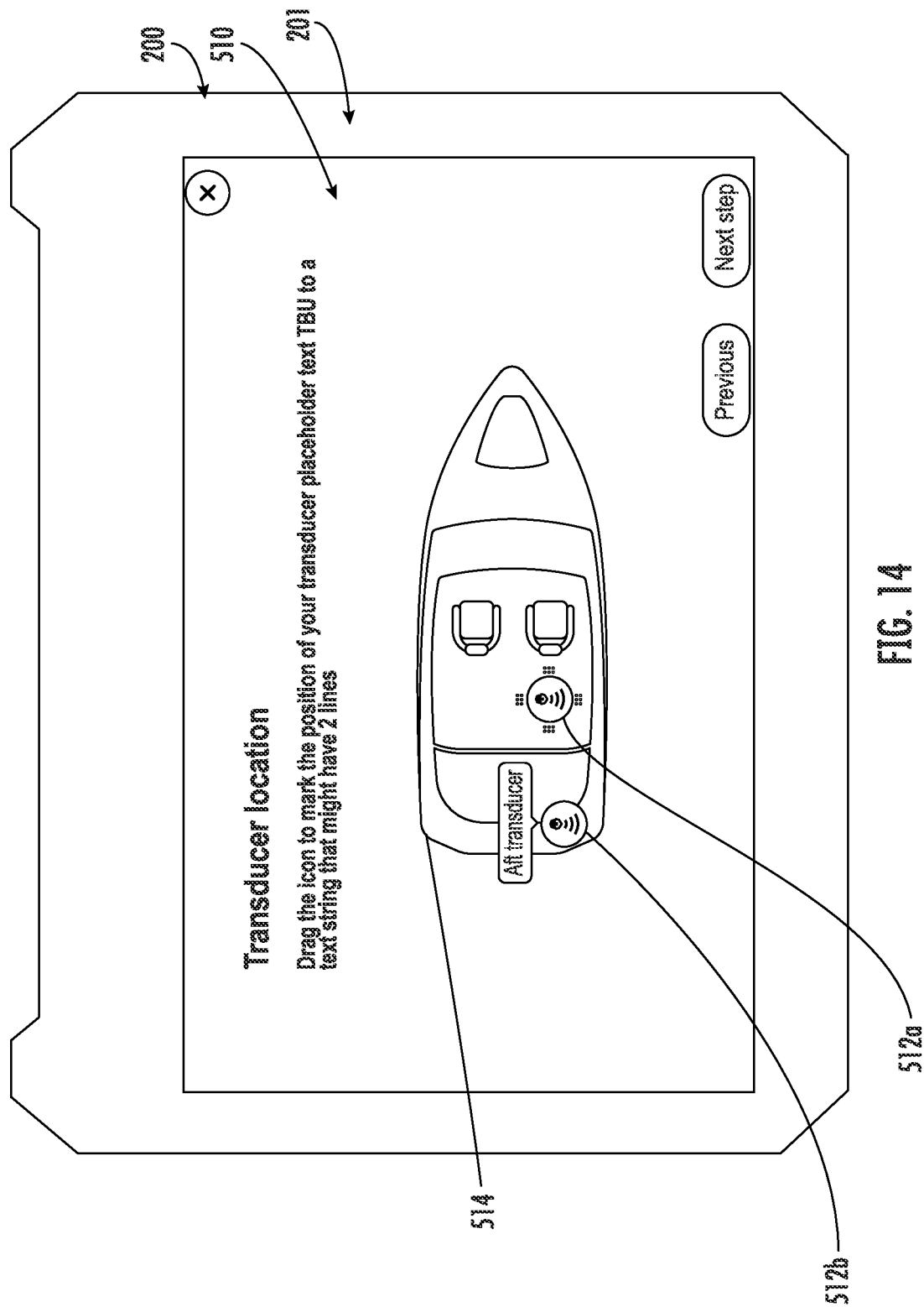
Figure 15:
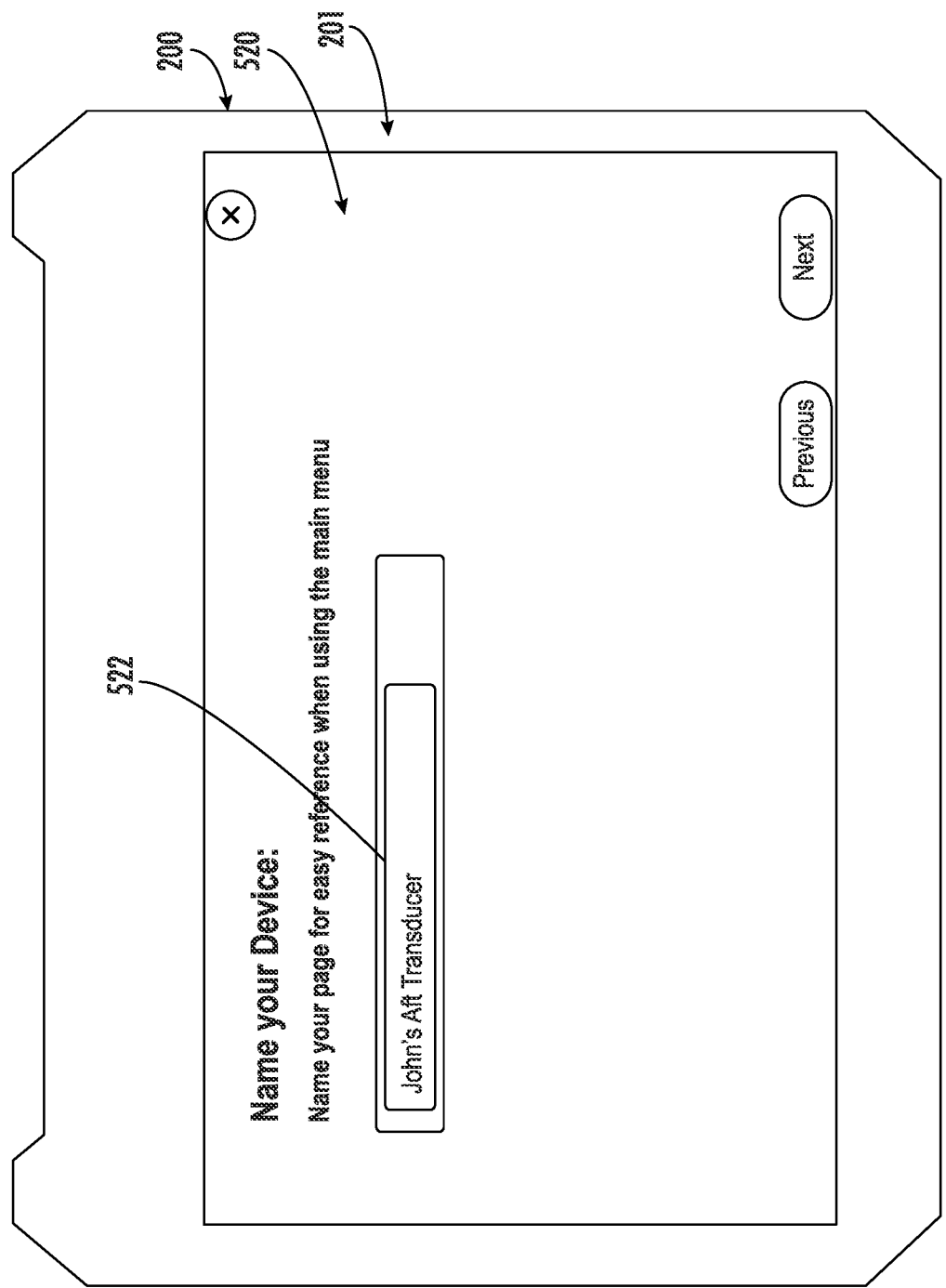
Figure 16:
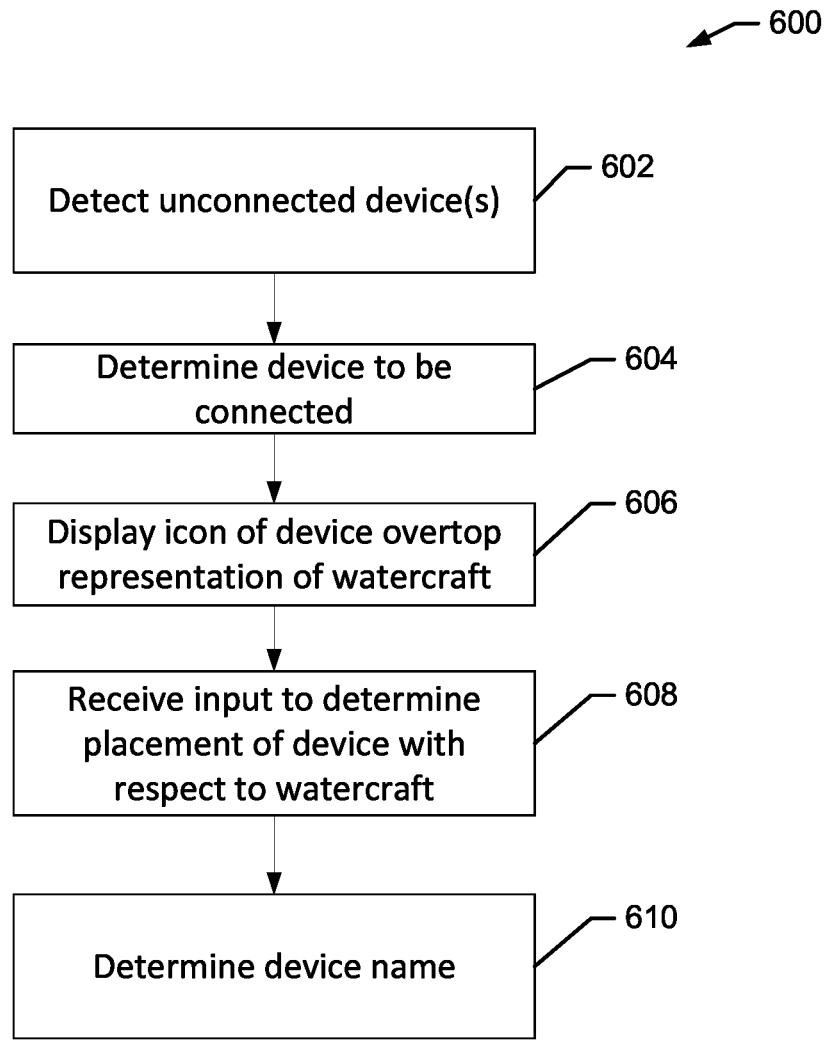
Figure 17:
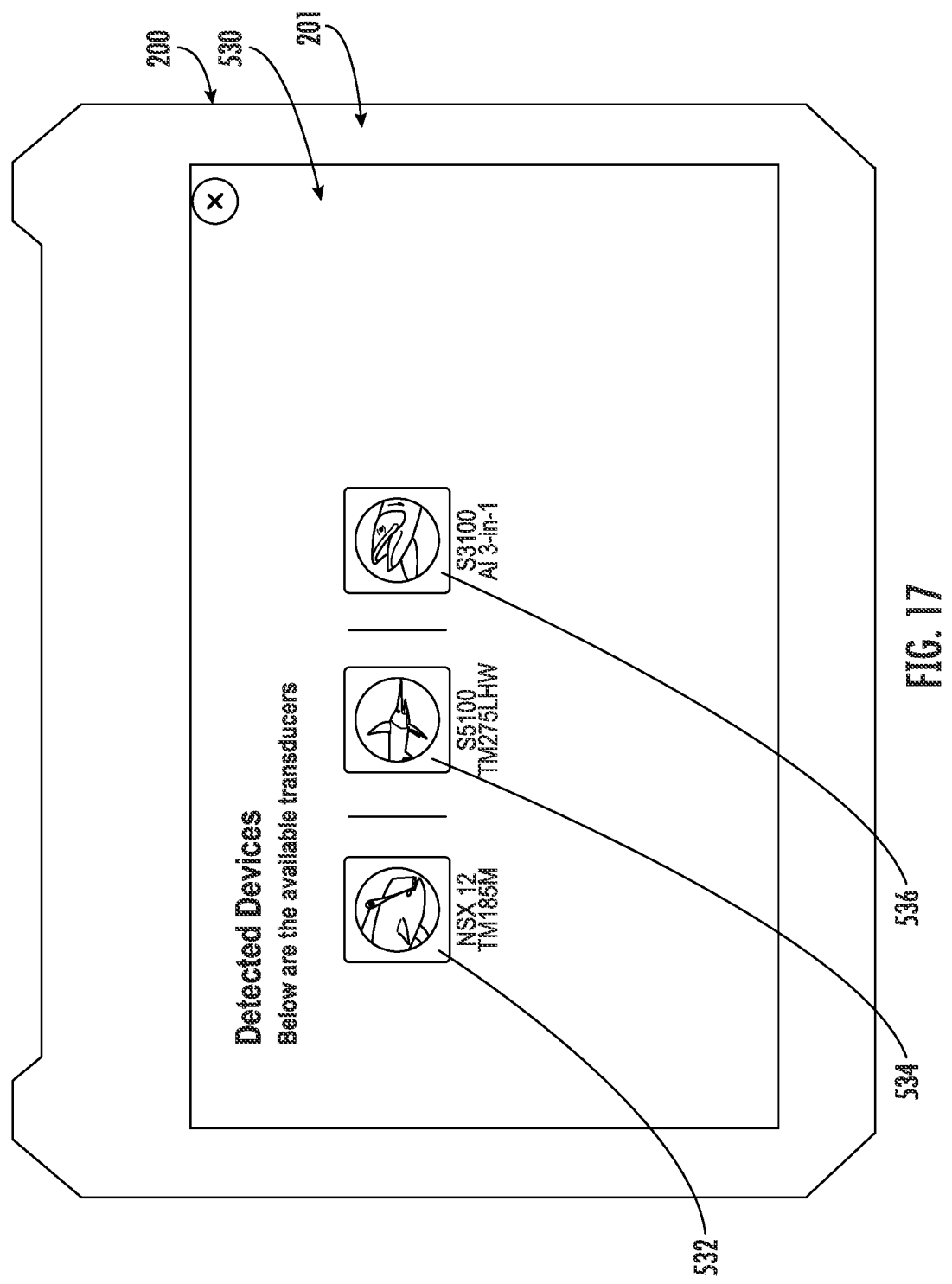
Figure 18:
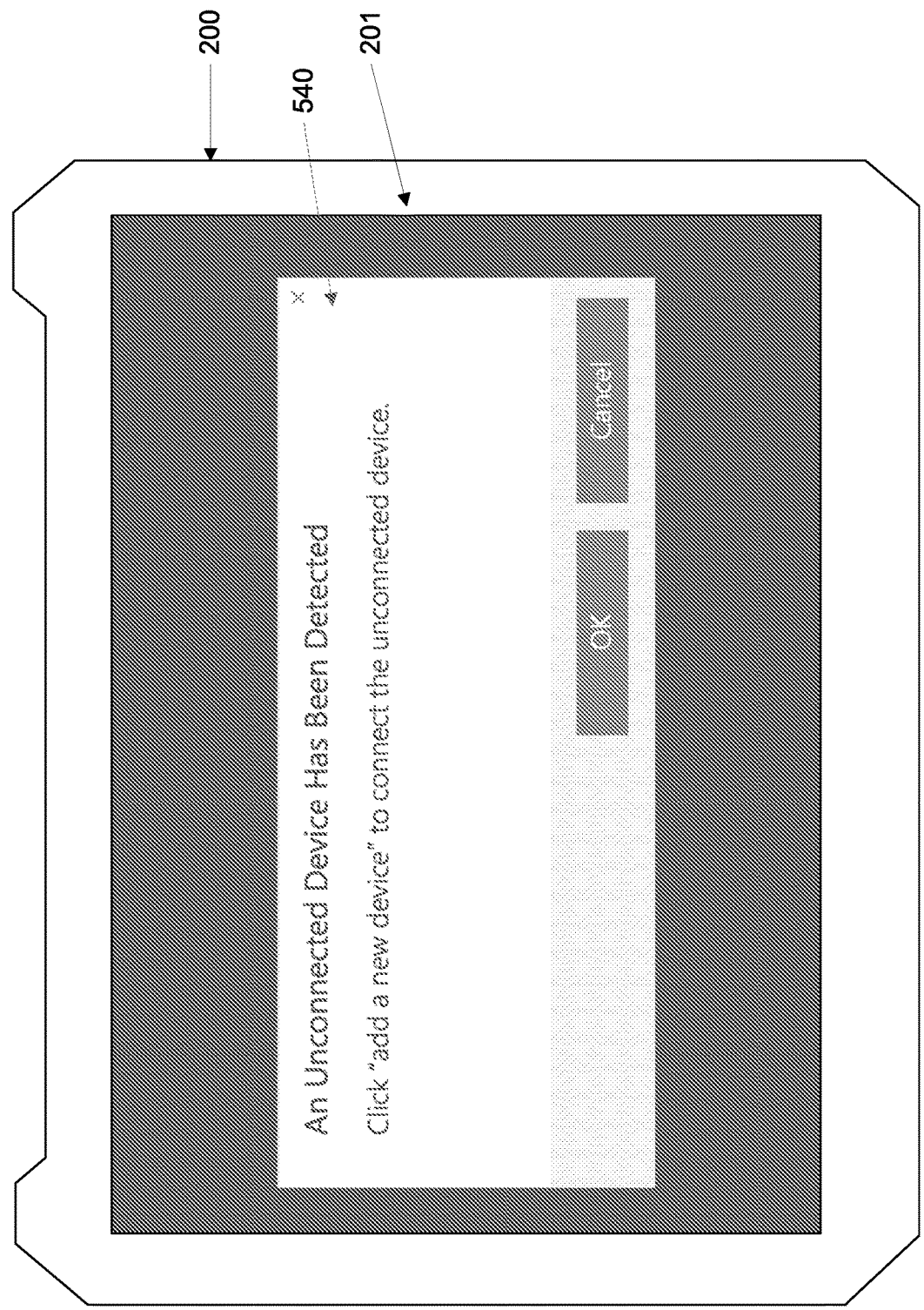
Figure 19:
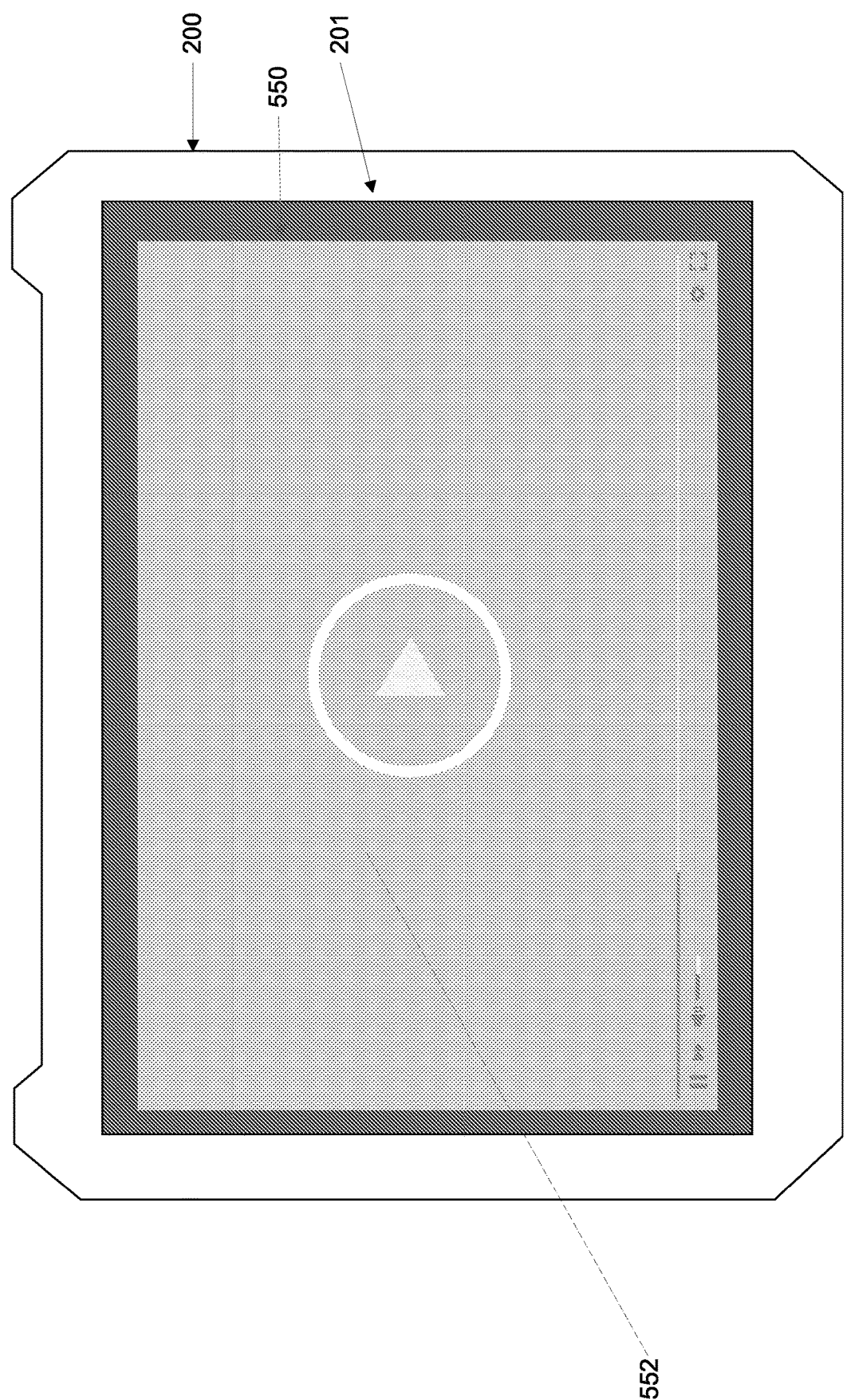
Figure 20:
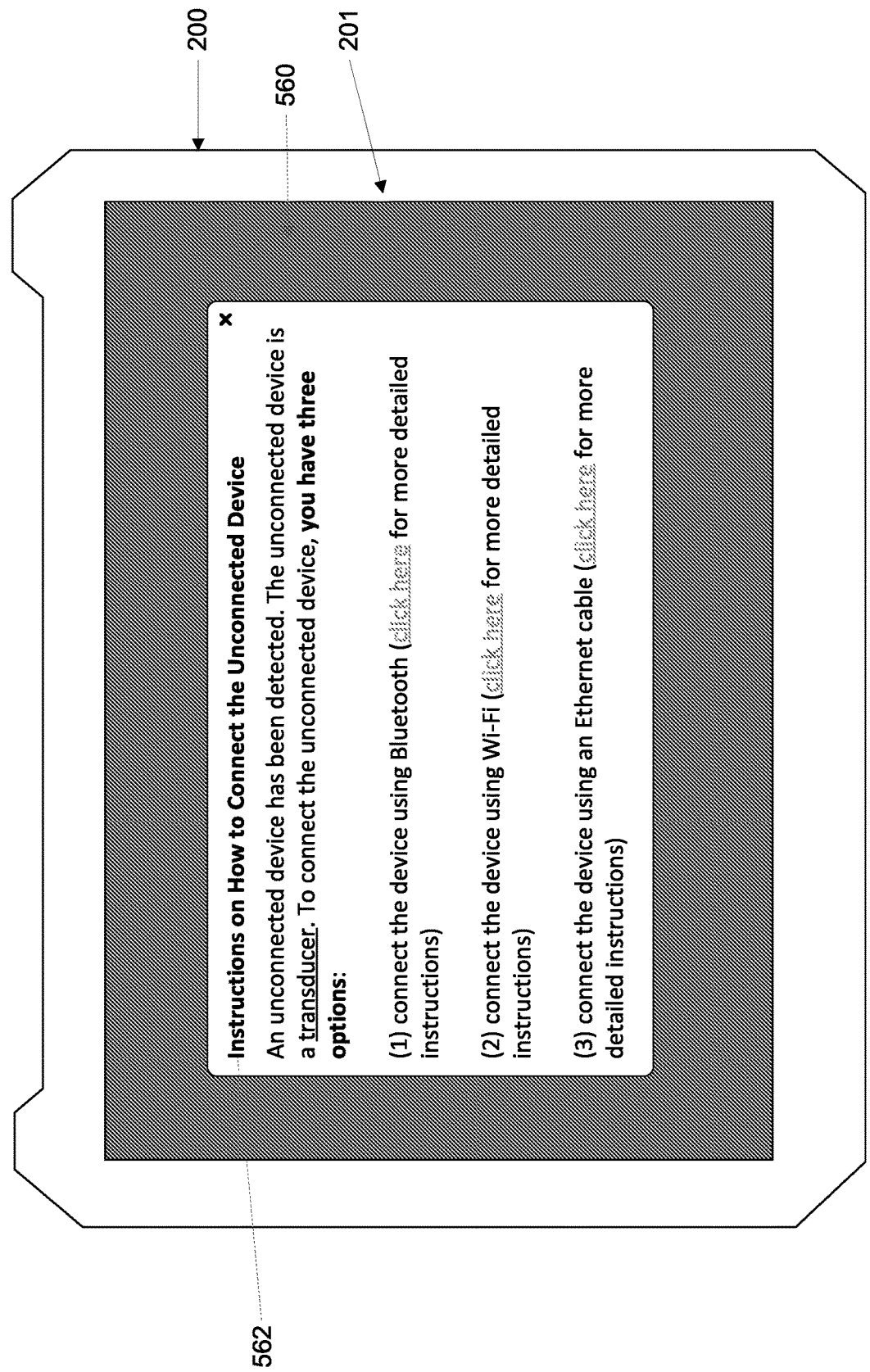

Having thus described the invention in general terms, reference will now be made to the accompanying drawings, which are not necessarily drawn to scale, and wherein:

FIG. 1 illustrates an example watercraft including a marine electronic device, in accordance with some embodiments discussed herein;

FIG. 2 shows an example marine electronic device presenting sonar data and chart data, in accordance with some embodiments discussed herein;

FIG. 3 shows an example marine electronic device presenting sonar data, radar data, and vessel data, in accordance with some embodiments discussed herein;

FIG. 4 illustrates a flowchart of an example method of updating a user interface of a marine electronic device based on user input, according to some embodiments discussed herein;

FIG. 5 illustrates a flowchart of another example method of updating a user interface of a marine electronic device based on user input, according to some embodiments discussed herein;

FIG. 6 shows an example marine electronic device presenting a user interface for receiving a fishing location, in accordance with some embodiments discussed herein;

FIG. 7 shows an example marine electronic device presenting a user interface for receiving a fishing style, in accordance with some embodiments discussed herein;

FIG. 8 shows an example marine electronic device presenting a user interface for receiving a fish type, in accordance with some embodiments discussed herein;

FIG. 9 shows an example marine electronic device presenting a user interface for receiving a depth range, in accordance with some embodiments discussed herein;

FIG. 10 shows an example marine electronic device presenting a user interface for selecting from available devices, in accordance with some embodiments discussed herein;

FIG. 11 shows an example marine electronic device presenting a user interface for selecting from a plurality of screen setups, in accordance with some embodiments discussed herein;

FIG. 12 shows an example marine electronic device presenting a user interface for receiving a name for a selected screen setup, in accordance with some embodiments discussed herein;

FIG. 13 shows an example marine electronic device presenting a user interface for selecting from one or more unconnected devices, in accordance with some embodiments discussed herein;

FIG. 14 shows an example marine electronic device presenting a user interface for marking a desired position of a device, in accordance with some embodiments discussed herein;

FIG. 15 shows an example marine electronic device presenting a user interface for receiving a name for a connected device, in accordance with some embodiments discussed herein;

FIG. 16 illustrates a flowchart of an example method of detecting and connecting an unconnected device, according to some embodiments discussed herein;

FIG. 17 shows an example marine electronic device presenting a user interface for displaying one or more unconnected devices, in accordance with some embodiments discussed herein;

FIG. 18 shows a marine electronic device presenting an example user interface for displaying a dialog box communicating information about an unconnected device to a user, in accordance with some embodiments discussed herein;

FIG. 19 shows a marine electronic device presenting an example user interface for displaying video and/or audio communicating information about an unconnected device to a user, in accordance with some embodiments discussed herein; and FIG. 20 shows a marine electronic device presenting an example user interface for displaying various methods for connecting an unconnected device, in accordance with some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

As depicted in FIG. 1, a watercraft 100 (e.g., a vessel) configured to traverse a marine environment, e.g., body of water 101, may use one or more sonar transducer assemblies 102a, 102b, and 102c disposed on and/or proximate to the watercraft. The watercraft 100 may be a surface watercraft, a submersible watercraft, or any other implementation known to those skilled in the art. The transducer assemblies 102a, 102b, and 102c may each include one or more transducer elements configured to transmit sound waves into a body of water, receive sonar returns from the body of water, and convert the sonar returns into sonar return data.

Depending on the configuration, the watercraft 100 may include a main propulsion motor 105, such as an outboard or inboard motor. Additionally or alternatively, the watercraft 100 may include trolling motor 108 configured to propel the watercraft 100 or maintain a position. The one or more transducer assemblies (e.g., 102a, 102b, and/or 102c) may be mounted in various positions and to various portions of the watercraft 100 and/or equipment associated with the watercraft 100. For example, the transducer assembly may be mounted to the transom 106 of the watercraft 100, such as depicted by transducer assembly 102a. The transducer assembly may be mounted to the bottom or side of the hull 104 of the watercraft 100, such as depicted by transducer assembly 102b. The transducer assembly may be mounted to the trolling motor 108, such as depicted by transducer assembly 102c.

The watercraft 100 may also include one or more marine electronic devices 160, such as may be utilized by a user to interact with, view, or otherwise control various aspects of the various sonar systems. In the illustrated embodiment, the marine electronic device 160 is positioned proximate the helm (e.g., steering wheel) of the watercraft 100—although other places on the watercraft 100 are contemplated. Likewise, additionally or alternatively, a user's mobile device may include functionality of a marine electronic device.

In some embodiments, a marine electronic device 200 may be used to determine a plurality of screen setups for a user to choose from based on received input from the user such as a fishing location, a fishing style, a fish type, or a fishing depth. In some embodiments, the plurality of screen setups may be determined based on at least two types of user input, such as at least two of a fishing location, a fishing style, a fish type, or a fishing depth. Further, the plurality of screen setups may be based on any other type of user input, such as user input relating to diving, water sports, cruising, sailing, etc. When more types of user input are used to determine the plurality of screen setups, the plurality of screen setups that is determined is generally more helpful to the user. In some embodiments, after a plurality of screen setups has been determined and presented to a user, the user still may have the option to customize a different screen setup that is not among the plurality of screen setups. The result is a page that can be saved by the user of the marine electronic device for future use.

FIG. 2 illustrates an example screen setup 202 on a screen 201 of the marine electronic device 200. Specifically, the screen setup 202 of FIG. 2 includes chart data 206 on the left and sonar data 204 on the right. One or more of the chart data 206 and the sonar data 204 may be available from one or more available devices on the watercraft 100, such as the one or more transducer assemblies (e.g., 102a, 102b, and/or 102c), the trolling motor 108, or any other type of device such as a sensor. The sonar data 204 may be from one of many different sonar types. For example, a desired sonar type of sonar data 204 may be determined from among at least two types of sonar data that are available from one or more available devices on the watercraft 100, such as the one or more transducer assemblies 102a, 102b, 102c (e.g., sidescan sonar, conical downscan sonar, linear downscan sonar, forwardscan sonar, 360 degree sonar, scanning sonar, live sonar, and/or various other types of sonar). In some embodiments, the desired sonar type may be determined over other sonar types based on the received user input corresponding to certain factors, such as a certain fish type that the user is hoping to catch, a fishing location that the user plans to fish at, a fishing style the user plans to use, a fishing depth the user plans to fish at, a speed the user plans to maintain, and/or various other user-indicated water activities that the user plans to engage in while using the marine electronic device.

FIG. 3 illustrates another example screen setup 210 on the screen 201 of the marine electronic device 200. Specifically, the screen setup 210 of FIG. 3 includes radar data 212 on the top left, vessel data 214 on the bottom left, and sonar data 204 on the right. The sonar data 204 may be of the same type as described above with respect to FIG. 2. The vessel data 214 may include, among other information, fuel information, battery information, watercraft speed information, and depth information. The vessel data 214 may be based on data from the one or more available devices, it may be calculated from predetermined values, or a combination of both. For example, the vessel data 214 may include fuel information, which includes a percentage of fuel remaining that is calculated, for example, by using data from a fuel tank sensor and a predetermined fuel tank volume. Similarly, the radar data 212 may be received from one or more of the available devices (e.g., a radar device).

The screen setups shown in FIGS. 2 and 3 may also include one or more adjustable settings, such as a depth window setting or zoom level setting. Further, the marine electronic device 200 may be configured to receive user input based on the one or more adjustable settings such that the user can indicate a determined setting for each of the one or more adjustable settings. For example, one of the one or more adjustable settings for the sonar data 204 may be a depth window setting, and the determined setting for the depth window setting may be determined based on user input from the user interface shown in FIG. 9, which is described in further detail herein. Further, the screen setups shown in FIGS. 2 and 3 might be adjustable based on one or more points of interest. For example, the chart data 206 in FIG. 2 may be adjustable based on a point of interest such as a fishing area, which may be pre-selected or inputted by the user.

FIG. 4 shows an example method 300 for updating a user interface based on user input, such as one or more of a fishing location, fishing style, fish type, or fishing depth. The method may include, at 302, determining a sonar type. For example, the sonar type might be downscan, sidescan, bird radar, or any other technology selection. The method may further include, at 304, determining a fishing style. For example, the fishing style might be saltwater inshore fishing, saltwater offshore fishing, or any other type of fishing. Further, the fishing style might be more specific, such as trolling, jogging, soft plastics, bottom fishing, or structure fishing, which are saltwater inshore fishing styles, or the fishing style might be bottom fishing, sword fishing, or pelagics trolling, which are saltwater offshore fishing styles. Alternatively, the fishing style of step 304 may be any other type of fishing style not listed herein. The method may also include, at 306, determining a fish type. For example, the fish type may be marlin and sailfish (black, blue, white, stripped, sailfish), swordfish, tuna, dolphin, wahoo, deepwater tablefish (e.g., grouper, bass), inshore sportfish (e.g., kingfish, amberjack, GT), baitfish, or any other type of fish. Notably, the method might include, at 306, presenting a list of fish types to a user which are typical fish types for the fishing style selected at 304, and determining the fish type based on the user's selection from the list of fish types. Further, in some embodiments, the fish type at 306 can be used to determine a frequency selection for the sonar technology. At 308, the method may include determining a fishing depth. The fishing depth may be compared with the sonar type chosen at 302, and if the sonar type is not compatible with the fishing depth, the method may include recommending other fishing depth options according to the selection at 302. For example, the method at 308 may include determining the fishing depth by providing a sliding scale of depths that has a maximum depth that matches the maximum depth capability of the sonar type chosen at 302. Next, the method may include, at 310, determining a viewing range. For example, the viewing range may be above a certain depth from the bottom surface, below a certain depth from the water surface, or between two depths. Finally, the method may include, at 312, determining a plurality of screen setups. The plurality of screen setups may be determined based on the input gathered at one or more of 302, 304, 306, 308, and 310. In some embodiments, the plurality of screen setups may be determined in a specified order, such as in order of most-recommended.

FIG. 5 shows another example method 400 for updating a user interface based on user input such as one or more of a fishing location, fishing style, fish type, or fishing depth. At 402, the method may include determining a fishing style. For example, the fishing style might be saltwater inshore fishing, saltwater offshore fishing, or any other type of fishing. Further, the fishing style might be more specific, such as trolling, jogging, soft plastics, bottom fishing, or structure fishing, which are saltwater inshore fishing styles, or the fishing style might be bottom fishing, sword fishing, or pelagics trolling, which are saltwater offshore fishing styles. Alternatively, the fishing style of step 402 may be any other type of fishing style not listed herein. At 404, the method may include determining a fish type. For example, the fish type may be marlin and sailfish (black, blue, white, stripped, sailfish), swordfish, tuna, dolphin, wahoo, deepwater tablefish (e.g., grouper, bass), inshore sportfish (e.g., kingfish, amberjack, GT), baitfish, or any other type of fish. Notably, the method might include, at 404, presenting a list of fish types to a user which are typical fish types for the fishing style selected at 402, and determining the fish type based on the user's selection from the list of fish types. Next, at 406, the method may include determining a depth range. The depth range may be above a certain depth from the bottom surface, below a certain depth from the water surface, or between two depths. At 408, the method may include determining an appropriate sonar type. Data from information collected at 402, 404, and 406 may be used to filter out certain types of sonar that would not be compatible with the determined fishing style, fish type, and depth range. For example, in some embodiments, a certain sonar type may be determined over other sonar types based on the received user input of a certain fish type that the user is hoping to catch. Finally, the method may include, at 410, determining a plurality of screen setups. The plurality of screen setups may be determined based on the information determined at one or more of 402, 404, 406, and 408. In some embodiments, the plurality of screen setups may be determined in a specified order, such as in order of most-recommended.

FIGS. 6-12 illustrate an example series of user interfaces which may guide a user in selecting a screen setup for a marine electronic device based on various user input parameters. FIG. 6 shows an example user interface 220 on the screen 201 of the marine electronic device 200. The user interface 220 asks the user to select a fishing location. For example, user interface 220 includes three fishing locations: inland 226, inshore/coastal 224, and offshore 222. In other embodiments, the user interface 220 may include additional fishing locations. The selected fishing location may be used to determine whether each of the one or more available devices is applicable. For example, certain types of devices may be applicable for inshore fishing but inapplicable for offshore fishing and thus will be deselected or greyed-out in later user interfaces (such as in FIG. 10) when the offshore fishing option 222 is selected by the user. The selected fishing location may also, in some embodiments, be used to define relevant depth ranges. For example, when the offshore fishing option 222 is selected, data may be pre-selected and auto populated into the fields illustrated in FIG. 9.

FIG. 7 shows another example user interface 230 on the screen 201 of the marine electronic device 200. The user interface 230 asks the user to select a fishing style. For example, user interface 230 includes four fishing styles: pelagic trolling 232, jigging 234, bottom fishing 236, and sword fishing 238. In other embodiments, the user interface 230 may include less, additional, and/or different fishing styles. The selected fishing style may be used to determine, for example, relevant depth ranges, sonar types to use, whether to use radar, among other things. For example, when the bottom fishing option 236 is selected, data may be pre-selected and auto populated into the fields illustrated in FIG. 9 to indicate that a depth range close to the bottom surface of the body of water is preferred. Additionally, the selected fishing style may be used to determine a desired frequency for sonar imaging.

FIG. 8 shows another example user interface 240 on the screen 201 of the marine electronic device 200. The user interface 240 asks the user to select a fish type. For example, user interface 240 includes four fish types: marlin 242, tuna 244, wahoo 246, and dolphin mahi mahi 248. In other embodiments, the user interface 240 may include less, additional, and/or different fish types. The selected fish type may be used to determine, for example, relevant depth ranges, sonar types to use, whether to use radar, among other things. For example, in some embodiments, when the dolphin mahi mahi option 248 is selected, data may be pre-selected and auto populated into the fields illustrated in FIG. 9 to indicate, for example, that a depth range between 10 and 45 meters is preferred. The preferred depth ranges corresponding to each fish type may be predetermined, and in some embodiments, the preferred depth ranges corresponding to each fish type may be adjustable by the user. In some embodiments, the selected fishing style may be used to determine a desired frequency for sonar imaging. For example, a frequency of approximately 60 hertz may be preferred for bluefin tuna, while a frequency of approximately 133 hertz may be preferred for squid and a frequency of 175 hertz may be preferred for cod.

FIG. 9 shows another example user interface 250 on the screen 201 of the marine electronic device 200. The user interface 250 allows the user to select a depth range. For example, user interface 250 includes three depth range display options: view the top 252, view the bottom 254, or view between 256. In other embodiments, the user interface 250 may include less, additional, and/or different depth range options. If the user chooses the view the top option 252, the user interface 250 is configured to receive a depth 258, which corresponds to a lower limit. For example, if the user enters "10 m" as depth 258, the resulting screen setup displays data corresponding to the 10 meters of water extending down from the surface of the water. Alternatively, if the user chooses the view the bottom option 254, the user interface is configured to receive a depth 260, which corresponds to an upper limit. For example, if the user enters "10 m" as depth 260, the resulting screen setup displays data corresponding to the 10 meters of water extending up from the bottom surface of the body of water. If the user chooses the view between option 256, the user interface is configured to receive depths 262 and 264. The depth 262 corresponds to an upper limit, and the depth 264 corresponds to a lower limit. For example, if the user enters "200 m" as depth 262 and "10 m" as depth 264, the resulting screen setup displays data corresponding to the range of water between a level that is 200 meters from the top surface of the body of water and 10 meters from the bottom surface of the body of water. The depth range selected by the user using user interface 250 may be used to determine scroll speed, frequency, or any other parameter or setting. For example, a deep depth range may yield a desired frequency that is different than that of a shallow depth range because different sonar frequencies are operable for viewing underwater environments at different depths from a watercraft. It should be appreciated that, in other embodiments, the depth range selected by the user may be used to calculate other parameters.

FIG. 10 shows another example user interface 270 on the screen 201 of the marine electronic device 200. The user interface 270 allows the user to view various available devices that are connected to the marine electronic device 200. Such connected available devices may be determined automatically (e.g., via network connection, such as NMEA2K connection, wireless connection, or other connection) and/or based on saved settings. The connected available devices are configured to provide one or more images to the marine electronic device for presentation on the screen of the marine electronic devices. For example, the one or more images may be chart data, sonar data, radar data, or vessel data. In FIG. 10, the user interface 270 presents six available devices 272, 274, 276, 278, 280, and 282. In other embodiments, the user interface 270 may be configured to display more, less, and/or different devices. In some embodiments, the user interface 270 is configured to allow the user to select and de-select one or more of the devices 272, 274, 276, 278, 280, and 282. For example, in FIG. 10, devices 272, 274, and 276 are selected, and devices 278, 280, and 282 are de-selected. In some embodiments, certain devices are automatically selected or de-selected based on the user's previous input from, for example, one or more of the user interfaces shown in FIGS. 6-9. Once the user selects and/or de-selects the various available devices on the user interface 270 and clicks the "Next" button 284, only the selected devices will be incorporated into the plurality of screen setups shown in FIG. 11.

FIG. 11 shows another example user interface 285 on the screen 201 of the marine electronic device 200. The user interface 285 presents five available screen setup icons 292, 288, 289, 291, and 287. Each of the screen setup icons 292, 288, 289, 291, and 287 includes sub-icons representing different data or image types that are accessible from the available devices shown in FIG. 10. In some embodiments, the screen setup options (which are represented by the screen setups icons 292, 288, 289, 291, and 287 in FIG. 11) are determined based on the data received from the user through one or more of the user interfaces 220, 230, 240, 250, and 270. For example, the screen setup options displayed by user interface 285 may vary depending on which fish type is selected by the user using user interface 240 in FIG. 8. More specifically, for example, a first type of sonar data may be included in one or more of the screen setup options instead of a second type of sonar data based on the user input of a certain fish type that the user is hoping to catch.

The screen setup icon 292, which is shown on the right side of the user interface 285 as an enlarged icon 286, represents a split screen option including radar data on the bottom right, chart data on the top right, and sonar data from a linear downscan transducer on the left. Alternatively, the screen setup icon 291 represents a split screen option including sonar data from a linear downscan transducer on the left, sonar data from a conical (traditional) downscan transducer in the middle, and chart data on the right. The screen setup icon 288 represents a split screen option including sonar data from a linear downscan transducer on the left, chart data on the top right, sonar data from a conical (traditional) downscan transducer on the middle right, and radar data on the bottom right. The screen setup icon 287 represents a split screen option including sonar data from a linear downscan transducer on the top left, sonar data from a conical (traditional) downscan transducer on the top right, and sonar data from a sidescan transducer on the bottom. The screen setup icon 289 represents a split screen option including two types of sonar data from linear downscan transducers, displayed side by side. In some embodiments, the two sub-icons of screen setup icon 289 may indicate that the screen 201 of the marine electronic device 200 will display data from the same linear downscan transducer at different frequencies, or in other embodiments, it may indicate that the screen 201 of the marine electronic device 200 will display sonar data from two different linear downscan transducers at the same (or different) frequencies. Other screen setup icons may, for example, represent the configurations shown in FIGS. 2 and 3. The user interface 285 also includes, in some embodiments, a "Build My Own" option 290. The "Build My Own" option 290 allows a user to construct a different screen setup based on data from the selected available devices from FIG. 10. In other embodiments, the user interface 285 may be configured to display more or less screen setup options.

When the user selects a screen setup from the plurality of screen setups displayed in user interface 285 (e.g., from the screen setup options 292, 288, 289, 291, and 287), the marine electronic device operates according to the selected screen setup such that the screen of the marine electronic device includes presentation of the data types represented on the icon screen setup icon (such as shown in FIGS. 2 and 3). In some embodiments, certain settings and parameters may be suggested and/or automatically updated based on the data received from the user through one or more of the user interfaces 220, 230, 240, 250, and 270. For example, in some embodiments, a certain zoom setting may be suggested and/or automatically updated within the selected screen setup based on the fishing depth indicated by the user through user interface 250. Further, in other embodiments, any other settings and/or parameters may be suggested and/or automatically updated within the selected screen setup based on some or all of the data received from the user through one or more of the user interfaces 220, 230, 240, 250, and 270.

FIG. 12 shows another example user interface 295 on the screen 201 of the marine electronic device 200. The user interface 295 receives a page name 296 to describe the selected screen setup from FIG. 11. In some embodiments, the user interface 295 may auto populate an appropriate name based on the information conveyed by the selected screen setup. When a name is auto populated, the user can overwrite the name with a customized page name. Once the user inputs the page name 296, the selected screen setup chosen by the user using user interface 285 may be saved under the page name 296 for future used by the marine electronic device 200.

FIGS. 13-15 illustrate a series of example user interfaces for showing a user detected devices and connecting a selected device to a marine electronic device. FIG. 13 shows a user interface 500 on the screen 201 of the marine electronic device for displaying and allowing a user to select from unconnected devices. More specifically, the user interface 500 displays unconnected devices such as unconnected devices 502, 504, and 506. The unconnected devices 502, 504, and 506 may be detected, for example, using Bluetooth, Wi-Fi, Ethernet, a mobile device/tablet, user input indicating they are available, or any other detection method. The unconnected devices may be, for example, transducers, such as those described with reference to FIG. 1. In some embodiments, the user may select one (or more) unconnected device to be connected to the marine electronic device 200.

FIG. 14 shows a user interface 510 on the screen 201 of the marine electronic device 200. In some embodiments, the user interface 510 may be configured to allow a user to position an icon representing a device (e.g., a device which was selected using the user interface shown in FIG. 13) overtop a representation of the watercraft 514, marking the position of the actual placement of the device on or otherwise relative to the watercraft 100. For example, position 512a represents an initial position of an icon representing a device, and position 512b represents a selected position of the icon representing the device, according to received input from the user. In some embodiments, the user may be able to drag the icon of the device across the screen 201 from position 512a to position 512b using, for example, a finger or a stylus. In other embodiments, the user may be able to indicate a position of the placement of the device on the watercraft 100 in any other way. Additionally, a processor in communication with the marine electronic device 200 may be configured to receive data from the device and store imagery that is representative of the device based on the received data. For example, the processor may be configured to receive data indicating that a device is a transducer and store imagery, such as a transducer icon, that is representative of the device being a transducer. The transducer icon may then be used as the icon of the device on user interface 510. In some embodiments, the user interface 510 may be configured to allow a user to reposition multiple icons representing multiple devices overtop a representation of the watercraft 514, marking the positions of the actual placements of the devices on the watercraft 100.

FIG. 15 shows a user interface 520 on the screen 201 of the marine electronic device 200. The user interface 520 may be configured to allow a user to indicate a device name 522 for the device being connected in FIGS. 13-15. In some embodiments, the user interface 520 may auto populate an appropriate name based on information gathered from the device. When a name is auto populated, the user can overwrite the name with a customized device name. Notably, by appropriately naming (e.g., automatically or through a user name) the device, that name can be used later efficiently and effectively. For example, without knowing the relative position and/or type of transducer, a user may otherwise select the wrong transducer and start viewing sonar imagery that may not make sense for the activity that they are engaged in. This can create frustration, especially for a novice user. Accordingly, such example embodiments, form intuitive naming systems and methods for devices to enable ease of use and selection later on.

FIG. 16 illustrates an example method 600 for detecting and connecting an unconnected device to a marine electronic device. The method may include, at 602, detecting one or more unconnected devices. At 604, the method may include determining a device to be connected out of the one or more unconnected devices at 602. For example, the device to be connected may be determined based on a user selection of one of the one or more unconnected devices from 602. Next, at 606, the method may include displaying an icon representing the device overtop a representation of the watercraft. At 608, the method may include receiving input to determine the placement of the device with respect to the watercraft. For example, if the user has placed the device at an aft position on the watercraft, the input at 608 may be the user dragging the icon of the device to a position that represents the aft position overtop the representation of the watercraft. At 610, the method may include determining a name for the device. For example, in some embodiments, the device name may be automatically populated based on the type of device and the received input from 608 (e.g., the device name may auto-populate as "Aft Transducer"). Also, in some embodiments, the method may include receiving user input to determine the device name at 610.

FIGS. 17-20 illustrate a series of example user interfaces on the screen 201 of a marine electronic device 200 for showing a user one or more unconnected devices that have been detected and indicating to the user how those one or more unconnected devices can be connected to the marine electronic device. FIG. 17 shows a user interface 530 on the screen 201 of the marine electronic device 200 for displaying one or more unconnected devices that have been detected (e.g., unconnected devices 532, 534, and 536). In some embodiments, the user interface 530 may include a message to the user indicating that certain unconnected devices have been detected and may suggest to the user that he or she take steps to connect the device(s). In some embodiments, the user interface 530 may explain to the user that the full advantages of the marine electronic device 200 are not being used while the unconnected device(s) remain unconnected. Further, in some embodiments, the user interface 530 may indicate any other information or consequences to the user regarding the unconnected state of the device(s).

FIG. 18 shows an example user interface 540 on the screen 201 of the marine electronic device 200 for prompting the user to connect one or more of the unconnected devices displayed by the user interface 530 shown in FIG. 17. The user interface 540 may take on one of various forms, of which the depiction in FIG. 18 is only one example. For example, the user interface 540 for prompting the user to connect one or more of the unconnected devices may include a button labeled "Click here to connect the unconnected device." As another example, the user interface 540 for prompting the user to connect one or more of the unconnected devices may include a message that reads "Upgrade your system by connecting the detected trolling motor to your marine electronic device." In other embodiments, the user interface 540 make take on any other form.

FIG. 19 shows another example user interface 550 on the screen 201 of the marine electronic device 200 for instructing the user on how to connect the one or more unconnected devices displayed by the user interface 530 shown in FIG. 17. In the example user interface 550 of FIG. 19, the instructions include an audio or video message 552. In other embodiments, the user interface 550 may include a link to an audio or video clip on the Internet. Moreover, in other example embodiments, the user interface 550 may include an infographic or any other indication which conveys instructions to the user on how to connect one or more of the unconnected devices. For example, in some embodiments, the user interface may include an augmented reality-based software that is operable to scan an environment for components and, based on scan results, present instructions to the user (in video, audio, augmented reality, or any other form).

FIG. 20 shows another example user interface 560 on the screen 201 of the marine electronic device 200 for instructing the user on how to connect the one or more unconnected devices displayed by the user interface 530 shown in FIG. 17. Specifically, the user interface 560 shown in FIG. 20 provides the user with more than one method of connecting the one or more unconnected devices. For example, a transducer may be able to be connected to the marine electronic device 200 through Bluetooth, Wi-fi, Ethernet, NMEA2K, or other network. In other embodiments, other connection methods may be displayed. Further, in other embodiments, the instructions appearing on the user interface 560 may be more or less extensive.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A system for updating a graphical user interface for a marine electronic device of a watercraft, the system comprising:
    a screen of the marine electronic device;
    a processor; and
    a memory including computer executable instructions, the computer executable instructions configured to, when executed by the processor, cause the processor to:
        receive user input, wherein the user input includes at least two of a fishing location, a fishing style, a fish type, or a fishing depth;
        determine one or more available devices, wherein each of the one or more available devices are connected to the marine electronic device and configured to provide one or more images to the marine electronic device for presentation on the screen of the marine electronic device;
        determine a plurality of screen setups to present to a user based on the received user input and the determined one or more available devices, wherein each of the plurality of screen setups includes presentation of at least two image types corresponding to the one or more images provided by the determined one or more available devices, wherein the presentation of the at least two image types covers at least a portion of the screen of the marine electronic device, wherein each of the at least two image types provide at least one of chart data, sonar data, radar data, or vessel data;
        enable selection from among the plurality of screen setups by the user;
        receive a user selection of a selected screen setup from among the plurality of screen setups, wherein the selected screen setup includes a first selected image type from a first device of the determined one or more available devices and a second selected image type from a second device of the determined one or more available devices; and
        cause the marine electronic device to operate according to the selected screen setup such that the screen of the marine electronic device includes presentation of the first selected image type and the second selected image type.

2. The system of claim 1, wherein the computer executable instructions are further configured to enable de-selection of at least one of the one or more available devices before the plurality of screen setups is determined.

3. The system of claim 1, wherein the computer executable instructions are further configured to determine the plurality of screen setups to include a first available screen setup that includes the first selected image type that provides a first type of sonar data and the second selected image type that provides the chart data, wherein the first type of sonar data is determined from among at least two types of sonar data that are available from the determined one or more available devices, wherein the first type of sonar data is determined instead of a second type of sonar data based on the received user input of a certain fish type that the user is hoping to catch.

4. The system of claim 3, wherein the computer executable instructions are further configured to determine the plurality of screen setups to include a second available screen setup that includes a first selected image type that provides the first type of sonar data, a second selected image type that provides the chart data, and a third selected image type that provides the radar data.

5. The system of claim 4, wherein the second available screen setup is configured such that the first selected image type is presented on half of the screen, the second selected image type is presented on a first quarter of the screen, and the third selected image type is presented on a second quarter of the screen.

6. The system of claim 1, wherein the computer executable instructions are further configured to determine the plurality of screen setups to include a first available screen setup that includes the first selected image type that provides a first type of sonar data and the second selected image type that provides the radar data, wherein the first type of sonar data is determined from among at least two types of sonar data that are available from the determined one or more available devices, wherein the first type of sonar data is determined instead of a second type of sonar data based on the received user input of a certain fish type that the user is hoping to catch.

7. The system of claim 1, wherein the computer executable instructions are further configured to determine the plurality of screen setups such that the first selected image type of the selected screen setup provides a first type of sonar data, and wherein the first selected image type is further determined to have a determined setting for an adjustable setting, wherein the determined setting is determined based on the user input.

8. The system of claim 7, wherein the adjustable setting is a depth window setting.

9. The system of claim 8, wherein the determined setting is determined automatically based on the user input.

10. The system of claim 8, wherein the determined setting is selected by the user.

11. The system of claim 8, wherein at least one of a depth window minimum or a depth window maximum of the depth window setting is user selectable.

12. The system of claim 1, wherein the computer executable instructions are further configured to determine the plurality of screen setups such that the first selected image type of the selected screen setup provides chart data, and wherein the first selected image type is further determined to have a determined setting for an adjustable setting, wherein the determined setting is determined based on the user input.

13. The system of claim 12, wherein the adjustable setting is a zoom level setting.

14. The system of claim 13, wherein the determined setting is determined automatically based on the user input.

15. The system of claim 13, wherein the determined setting is selected by the user.

16. The system of claim 1, wherein the computer executable instructions are further configured to determine the plurality of screen setups such that the first selected image type of the selected screen setup is further determined to have a determined setting for an adjustable setting, wherein the determined setting is determined based on one or more points of interest.

17. The system of claim 1, wherein the computer executable instructions are further configured to:
   detect a device proximate the watercraft;
   present, on the screen, a movable representation of the device with an image representing the watercraft;
   receive user input moving the movable representation of the device to a desired position on the image representing the watercraft;
   determine the desired position;
   determine a name for the device; and
   store the name and the desired position for the device in the memory.

18. The system of claim 1, wherein the computer executable instructions are further configured to:
   detect an unconnected device;
   determine identification information for the unconnected device;
   determine at least one connection method for the unconnected device; and
   present an indication to the user on the screen, wherein the indication includes the at least one connection method.

19. A marine electronic device for presenting marine data associated with a watercraft, wherein the marine electronic device comprises:
   a screen;
   a processor; and
   a memory including computer executable instructions, the computer executable instructions configured to, when executed by the processor, cause the processor to:
      receive user input, wherein the user input includes at least two of a fishing location, a fishing style, a fish type, or a fishing depth;
      determine one or more available devices, wherein each of the one or more available devices are connected to the marine electronic device and configured to provide one or more images to the marine electronic device for presentation on the screen of the marine electronic device;
      determine a plurality of screen setups to present to a user based on the received user input and the determined one or more available devices, wherein each of the plurality of screen setups includes presentation of at least two image types corresponding to the one or more images provided by the determined one or more available devices, wherein the presentation of the at least two image types covers at least a portion of the screen of the marine electronic device, wherein each of the at least two image types provide at least one of chart data, sonar data, radar data, or vessel data;
      enable selection from among the plurality of screen setups by the user;
      receive a user selection of a selected screen setup from among the plurality of screen setups, wherein the selected screen setup includes a first selected image type from a first device of the determined one or more available devices and a second selected image type from a second device of the determined one or more available devices; and
      cause the marine electronic device to operate according to the selected screen setup such that the screen of the marine electronic device includes presentation of the first selected image type and the second selected image type.

20. A method for updating a graphical user interface for a marine electronic device of a watercraft, the method comprising:
   receiving user input, wherein the user input includes at least two of a fishing location, a fishing style, a fish type, or a fishing depth;
   determining one or more available devices, wherein each of the one or more available devices are connected to the marine electronic device and configured to provide one or more images to the marine electronic device for presentation on a screen of the marine electronic device;
   determining a plurality of screen setups to present to a user based on the received user input and the determined one or more available devices, wherein each of the plurality of screen setups includes presentation of at least two image types corresponding to the one or more images provided by the determined one or more available devices, wherein the presentation of the at least two image types covers at least a portion of the screen of the marine electronic device, wherein each of the at least two image types provide at least one of chart data, sonar data, radar data, or vessel data;
   enabling selection from among the plurality of screen setups by the user;
   receiving a user selection of a selected screen setup from among the plurality of screen setups, wherein the selected screen setup includes a first selected image type from a first device of the determined one or more available devices and a second selected image type from a second device of the determined one or more available devices; and
   causing the marine electronic device to operate according to the selected screen setup such that the screen of the marine electronic device includes presentation of the first selected image type and the second selected image type.

* * * * *